US011797020B1

(12) United States Patent
Jiang et al.

(10) Patent No.: US 11,797,020 B1
(45) Date of Patent: Oct. 24, 2023

(54) SYSTEM FOR AUTONOMOUS MOBILE DEVICE MOTION CONTROL USING IMAGE DATA

(71) Applicant: AMAZON TECHNOLOGIES, INC., Seattle, WA (US)

(72) Inventors: Wenqing Jiang, San Jose, CA (US); Xin Yang, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 428 days.

(21) Appl. No.: 17/072,943

(22) Filed: Oct. 16, 2020

(51) Int. Cl.
*G05D 1/02* (2020.01)
*G05D 1/00* (2006.01)
*G06T 7/73* (2017.01)
*G06V 10/60* (2022.01)
*G06V 40/10* (2022.01)

(52) U.S. Cl.
CPC ......... *G05D 1/0246* (2013.01); *G05D 1/0094* (2013.01); *G06T 7/74* (2017.01); *G06V 10/60* (2022.01); *G06V 40/10* (2022.01); *G05D 2201/0207* (2013.01); *G06T 2207/10152* (2013.01); *G06T 2210/12* (2013.01)

(58) Field of Classification Search
CPC ............... G05D 1/0246; G05D 1/0094; G05D 2201/0207; G06T 7/74; G06T 2207/10152; G06T 2210/12; G06V 10/60; G06V 40/10
USPC .......................................................... 701/28
See application file for complete search history.

(56) References Cited

U.S. PATENT DOCUMENTS

| 8,849,036 B2 * | 9/2014 | Shin ..................... G05D 1/0246 382/153 |
| 11,567,504 B1 * | 1/2023 | Bai ....................... G05D 1/0219 |
| 2006/0293810 A1 * | 12/2006 | Nakamoto ........... G05D 1/0274 701/28 |

FOREIGN PATENT DOCUMENTS

| CN | 107481284 | * 12/2017 |
| KR | 101850835 | * 5/2018 |

OTHER PUBLICATIONS

"Perspective-n-Point", Wikipedia, 4 pages. Retrieved from the Internet: URL: https://en.wikipedia.org/wiki/Perspective-n-Point.
"Pid controller", Wikipedia, 19 pages. Retrieved from the Internet: URL: https://en.wikipedia.org/wiki/PID_controller.
"Visual servoing", Wikipedia, 9 pages. Retrieved from the Internet: URL: https://en.wikipedia.org/wiki/Visual_servoing.

(Continued)

*Primary Examiner* — Muhammad Shafi
(74) *Attorney, Agent, or Firm* — Lindauer Law, PLLC

(57) ABSTRACT

An autonomous mobile device (AMD) interacts with a user to provide tasks such as conveniently displaying information on a screen and moving with the user as they move. The AMD determines an area, or bounding box, of a user appearing within images obtained by a camera that is mounted on the AMD. A preferred area, with respect to the images, such as a center of the image, is specified to provide desired framing of images. As images are acquired by the camera, a difference between the bounding box and the preferred area is determined. Based at least in part on this difference, instructions are determined to move one or more of the cameras or the entire AMD to try and reframe the bounding box in subsequent images closer to the preferred area. Other factors, such as the user being backlit, may also be considered in determining the instructions.

20 Claims, 12 Drawing Sheets

(56) References Cited

OTHER PUBLICATIONS

Chaumette, et al., "Visual Servo Control, Part I: Basic Approaches", IEEE Robotics & Automation Magazine, Institute of Electrical and Electronics Engineers, Dec. 2006, 10 pgs.
Hutchinson, et al., "A Tutorial on Visual Servo Control", IEEE Transactions on Robotics and Automation, vol. 12, No. 5, Oct. 1996, pp. 651-670.
Sobottka, et al., "A novel method for automatic face segmentation, facial feature extraction and tracking", Department of Informatics, University of Thessaloniki 540 06, Greece, pp. 1-35.

* cited by examiner

US 11,797,020 B1

SYSTEM FOR AUTONOMOUS MOBILE DEVICE MOTION CONTROL USING IMAGE DATA

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
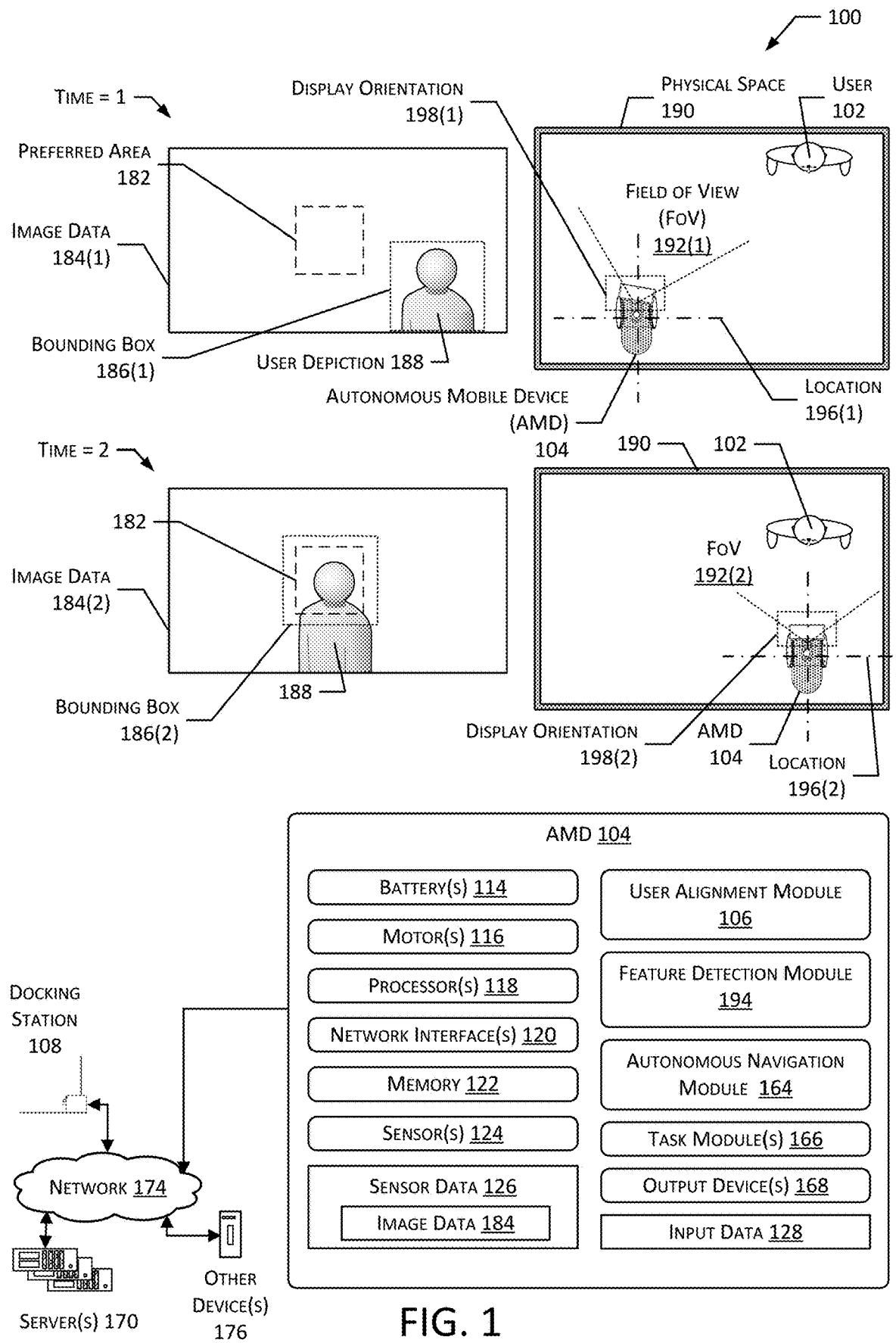
FIG. 1 illustrates a system for moving an autonomous mobile device (AMD) from a first physical configuration to a second physical configuration to align at least a portion of the AMD with a user, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) may be a robot capable of autonomous movement from one location in a physical space to another location without being controlled by a user. The AMD may perform tasks that involve displaying information, accepting input, acquiring sensor data, and so forth. A user may interact with the AMD.

The AMD moves in the physical space. For example, the AMD may translate or rotate. The AMD may include one or more moveable portions mounted to a chassis of the AMD. For example, a moveable portion may comprise a display and a camera that may pan and tilt, relative to the chassis. The display on the AMD has a view angle. A user outside of the view angle may not be able to clearly see the display. The camera on the AMD has a field of view (FOV) that is the extent of the physical space represented by image data acquired using the camera.

Some tasks performed by the AMD may be hindered if a user moves to a new physical location. For example, the user may be unable to view video on the display if they move outside of the view angle. Similarly, if the camera on the AMD is used for a video call and the user moves outside the field of view of the camera, the user is no longer visible on the video call.

To facilitate a desired alignment between at least a portion of the AMD and the user, image data is analyzed to determine where the user is within an image, and how to move the AMD to maintain the user within a specified area of the image. While moving or stationary, the AMD may analyze the image data to determine a relative location of the user. Based on this relative location, the AMD may determine a physical configuration that, when the AMD assumes that physical configuration, will produce a desired alignment.

The physical configuration may include one or more of physical location of the AMD, orientation of the chassis of the AMD relative to the physical space, orientation of a moveable portion of the AMD, and so forth. For example, a first physical configuration may specify a particular pan and tilt angle of the moveable portion that includes the display. In another example, a second physical configuration may specify a different physical location and orientation of the AMD in the physical space.

The AMD may detect users depicted in the image data. For example, a facial recognition system may determine a bounding box that specifies an area within the image that corresponds to a face. A location of the bounding box may be compared to a preferred area, such as a center of the image. The preferred area specifies an area within the image data where the user should be depicted. For example, the preferred area may be centered in the image. In implementations where the display and the camera share a common orientation, such as having at least a portion of the viewing angle and the FOV overlap, it may be assumed that a user appearing in the center of the image data also has a clear view of the display.

If the bounding box is outside of the preferred area, an offset is determined that is indicative of a distance and a direction of the bounding box relative to the preferred area. Based on the offset, the AMD determines a physical configuration that is deemed to result in the desired alignment. For example, if the bounding box is to the left of the preferred area, the physical configuration may represent the moveable portion containing the camera being panned to the left.

If a depiction of a user is at an edge of acquired image data and the user moves outside the camera's field of view, a subsequent acquired image may not depict the user. In such a situation, the AMD may be unable to reacquire location information for the user. A preferred area of image data will often be the center of the image data, but a preferred area may be specified to be an area of the image data other than the center.

By analyzing the image data to determine the physical configuration of the AMD, the AMD is able to maintain a desired alignment with the user. For example, a user may initiate a video call on the AMD, and subsequently the user may begin to move about the physical space. As the user moves, the AMD maintains alignment of the moveable portion comprising the camera and the display, attempting to keep the image of the user within the preferred area.

The AMD may recognize poor visual conditions and move to a physical configuration that attempts to avoid those poor visual conditions. For example, a user standing between the AMD and a light source is backlit, leaving their face underexposed. Based on a comparison of pixel values of a bounding box of the user depiction with pixel values of a comparison area around the user depiction, the AMD may determine a backlighting situation has occurred. In response, the AMD may determine a physical configuration in which the AMD is in a different physical location that reduces or removes the backlighting effect while still maintaining the user within the preferred area.

The AMD may use location information of a user from other sensors to improve the accuracy of image-based responses or to determine whether the AMD should be recalibrated. For example, the AMD may acquire image data of a user at a first time and analyze the image contents to determine a physical configuration that indicates a new location to move to or a new orientation for a display or camera. The AMD may use other sensors to physically locate the user within the physical space shared by the AMD and the user. The AMD may then use the physical location of the user within the three-dimensional physical space using the sensor-based data to predict a corresponding location of the user within the two-dimensional area of image data of the user.

Continuing with this example, the corresponding location of a user within the two-dimensional area within the image data may be compared to the location of a bounding box in the image data depicting the user. This comparison, depending on whether the difference in the predicted location and the bounding box location exceeds a calibration threshold value, may be a basis for the AMD determining that a calibration would improve operation of the AMD. In some examples, the calibration threshold value may be specified to allow for some degree of divergence, but still allow for substantial periods without maintenance or calibration.

In other examples, instead of using the predicted location of a user within the two-dimensional area within the image data based on sensor data, the predicted location of the user within the two-dimensional area within the image data may be used to adjust a new physical configuration or movement made by the AMD based solely on an image-based analysis of image data. For example, a difference between the predicted location and the bounding box location may be split in a determination of a physical configuration.

By using the techniques described in this disclosure, the AMD is able to quickly and efficiently maintain alignment with respect to a user. This facilitates presentation of information to the user by maintaining the user within the viewing angle of the display device. Acquisition of sensor data, such as image data from a camera during a video call, is also facilitated by maintaining the user within the FOV of the camera.

Illustrative System

FIG. 1 illustrates a system 100 for moving an autonomous mobile device (AMD) from a first physical configuration to a second physical configuration to align at least a portion of the AMD with a user, according to some implementations.

The AMD 104 may include one or more movable portions mounted to a chassis. The AMD 104 may also include at least one camera, at least one display, and wheels, that may be aligned according to a physical configuration. The camera may be mounted on a movable portion of the AMD 104 and be aligned according to the physical configuration. The display may also be mounted on a portion of the AMD 104 and be aligned according to the physical configuration. The camera and the display may be mounted on the same portion of the AMD 104 or on different portions. The physical configuration information may indicate a physical location of the AMD 104 within a physical space 190 and an orientation of each movable portion of the AMD 104.

The AMD 104 is shown in a physical space 190 at a first time t=1 and a second time t=2. The physical space 190 also includes a user 102. At the first time, the AMD 104 is at location 196(1), has a camera field of view 192(1), and has a display orientation 198(1). The AMD 104 may acquire image data 184(1) for each image acquired by the AMD 104, where the image is a set of pixels and associated pixel values, including brightness, location, and color. The image data 184(1) may include metadata describing image size, image boundaries, and conditions under which an image was acquired, including a timestamp and a value measuring light sensitivity, among other values.

At the first time, the image data 184(1) corresponds to a visible area of the physical space 190 within the field of view 192(1) of the camera. A physical configuration of the AMD 104 at the first time may specify orientation, a physical location 196(1) of the AMD 104 within the physical space 190, the orientation of the portion of the AMD 104 on which the camera is mounted, and the display orientation 198(1).

The orientation of the various portions of the AMD 104 may be indicative of a particular location with respect to a plurality of orthogonal axes and rotation with respect to individual ones of the axes. For example, the orientation may comprise six-dimensional (6D) information indicative of coordinates in three-dimensional space with respect to a designated origin and rotation with respect to each of the three axes.

The image data 184(1) includes a user depiction 188 of the user 102 within the physical space 190. The image data 184(1) also includes a preferred area 182 and a bounding box 186(1). The preferred area 182 indicates an area within the image data 184(1) within which the AMD 104 attempts to maintain a depiction of a user 102. The preferred area 182 may be specified based on one or more factors, including decreasing a data acquisition rate at which successive image data is acquired while continuing to provide depictions of a moving user 102 without the moving user 102 leaving the field of view 192(1) or including a user preference for an area within which the user 102 prefers to be displayed. A user 102 may be anything that may be of interest to performing the tasks of the AMD 104, such as a human adult, a human child, a pet, or another robot. In some implementations, the alignment may be performed relative to an object.

The bounding box 186(1) includes an area of the image data 184(1) that includes some or all of a user depiction 188. The bounding box 186(1) size may be determined based on a size of an area occupied by some or all of the user depiction 188, as described below with respect to FIG. 4. A depiction of the user 102 may be determined using a feature detection module 194. A bounding box 186 may include all parts of a depiction of a user 102 or may include a minimally sized, yet distinguishable, depiction of a user 102, such as a user's face or a portion of a user's face.

At the first time, the AMD 104 may be in a first physical configuration. Based on the location of the bounding box 186(1) within the image data 184(1) relative to the preferred area 182 within the image data 184(1), the AMD 104 may determine a second physical configuration. The second physical configuration of the AMD 104 may be determined based on moving the AMD 104 to a new location or orientation that depict the user 102 closer to, or within, the preferred area 182 in subsequent image data 184. The image-based analysis for determining the second physical configuration based on the first physical configuration and the comparison of the bounding box 186(1) and the preferred area 182 is described in greater detail below with respect to FIG. 4.

At the second time, the AMD 104 acquires second image data 184(2). Given the field of view 192(2) of the camera, the acquired image data 184 may depend on an orientation of the camera and the location of the AMD 104. Information about camera orientation, display orientation 198(2), orientations of other portions of the AMD 104, and the location of the AMD 104, are specified by a physical configuration of the AMD 104 at the second time.

At the second time, after the movement according to the second physical configuration of the AMD 104, the camera is oriented so that the user 102 is centered within the field of view 192(2) of the camera, the display orientation 198(2) has been updated, and the location 196(2) has changed.

The image data 184(2), similar to the image data 184(1), includes a user depiction 188 of the user 102 within the physical space 190. However, because the AMD 104 has moved to the second physical configuration, the image data 184(2) now depicts the user 102 in the preferred area 182.

Image data 184(2) includes a preferred area 182 that is the same preferred area 182 described with respect to image data 184(1). In contrast to image data 184(1) acquired at the first time, image data 184(2) acquired at the second time includes the bounding box 186(2) of the user depiction 188 that is within the preferred area 182.

The AMD 104 may include a user alignment module 106 that processes the image data 184 to determine one or more image-based features, including: an offset from a bounding box 186 to a preferred area 182, feature orientation of a depicted user 102, bounding box dimensions, or bounding box deltas indicative of changes in bounding box sizes between image data 184.

The user alignment module 106 may use the one or more image-based features to determine a physical configuration for the AMD 104. For example, based at least in part on the one or more image-based features, the AMD 104 may determine a physical configuration that is indicative of a vector for moving the AMD 104 within the physical space 190, an orientation of a camera mounted on the AMD 104, or an orientation of a display mounted on the AMD 104. In some examples, a vector for moving the AMD may specify one or more of: a direction, a distance, a velocity, or acceleration. The physical configuration may specify information that is interpreted by the autonomous navigation module 164 to move the AMD 104. The physical configuration may also specify information that is interpreted by an actuator controller that operates moveable component actuators to produce movement of the moveable component, including the portion of the AMD 104 on which the camera is mounted and the portion of the AMD 104 on which the display is mounted.

The user alignment module 106 may prioritize among different physical configurations that similarly result in the user depiction 188 being within the preferred area 182. For example, at time t=1 and with respect to image data 184(1), the AMD 104 has a physical configuration that includes a physical location 196(1) and a display configuration 198(1). In this example, the AMD 104 may have multiple options to move the user depiction 188 from the bounding box 186(1) into the preferred area 182. A first option may be to pan the camera toward the user 102. A second option may be to rotate the chassis of the AMD 104 without changing physical locations. A third option may be to move the entire AMD 104 from a first physical location 186(1) to a second physical location 186(2). For simplicity, three options are listed, but other options may include combinations of one or more of the above three options.

In this example, the possible options for a physical configuration may be prioritized according to an amount of changes to a physical configuration of the AMD 104 included with each option. For example, physical configurations with fewer changes may be prioritized for selection before physical configurations with more changes. As a first prioritization example, physical configurations that only include panning or tilting the camera may be a first priority and may be selected before physical configurations that include chassis rotation or moving the AMD 104. As a second prioritization example, physical configurations that include rotating the chassis of the AMD 104 may be selected before physical configurations that include moving the AMD 104. As a third prioritization example, physical configurations that include moving the AMD 104 may be selected before physical configurations that include moving the AMD 104 and one or more of: panning the camera, tilting the camera, or rotating the chassis of the AMD 104.

The user alignment module 106 may store image data 184 and alignment data within a data store of the AMD 104, where the image data 184 may include camera images and camera image metadata, and alignment data may include physical configuration data, image-based dimension calculations, and image-based dimensions. The image data and alignment data are depicted as image data 184 and alignment data 240 with respect to FIG. 2, described below.

The AMD 104 may include a feature detection module 194. The feature detection module 194 may determine a feature orientation of a user 102 based on detection of multiple feature points, determining planes and orientations of the planes, and extruding a normal from a plane corresponding to facial features. The user alignment module 106 may use the feature detection module 194 to determine feature orientation of user depictions 188 within image data 184.

The AMD 104 may include one or more sensors 124 (described below) that have different fields of view (FOV) 192. For example, a first sensor for a pair of cameras may be a time-of-flight depth sensor. The AMD 104 may be configured to dock or connect to a docking station 108. The docking station 108 may provide external power which the AMD 104 may use to charge a battery 114 of the AMD 104.

The AMD 104 may move through the physical space 190. The motion of the AMD 104 may be described as a trajectory. In some implementations the trajectory may include a series of poses. Each pose may be indicative of a particular location with respect to a plurality of orthogonal axes and rotation with respect to individual ones of the axes. For example, the pose may comprise six-dimensional (6D) information indicative of coordinates in three-dimensional space with respect to a designated origin, and rotation with respect to each of the three axes.

The AMD 104 may include battery(s) 114 to provide electrical power for operation of the AMD 104. The battery 114 may be rechargeable, allowing it to store electrical energy obtained from an external source. In other implementations, a wireless power receiver may be used to provide power for operation of the AMD 104, recharge the battery 114, and so forth.

One or more motors 116 or other actuators enable the AMD 104 to move from one location in the physical space 190 to another. For example, a motor 116 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interfaces 120. The network interfaces 120 may include devices to connect to personal area networks (PANS), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 includes one or more memories 122. The memory 122 may comprise one or more non-transitory computer-readable storage media (CRSM).

The AMD 104 may include one or more sensors 124. For example, the sensors 124 may include microphones, time-of-flight (TOF) sensors, cameras, LIDAR, and so forth. The sensors 124 may generate sensor data 126. The sensors 124 are discussed in more detail with regard to FIG. 3.

During operation, the AMD 104 may determine input data 128. The input data 128 may include or be based at least in part on sensor data 126 from the sensors 124 onboard the AMD 104. In one implementation, a speech processing module may process raw audio data obtained by a microphone on the AMD 104 and produce input data 128. For example, the user may say "robot, come here" which may produce input data 128 "come here". In another implementation, the input data 128 may comprise information such as a command provided by another computing device, such as a smartphone or tablet computer.

A mapping module determines a representation of the physical space 190 that includes obstacles and their locations in the physical space 190. During operation, the mapping module uses the sensor data 126 from various sensors 124 to determine information such as where the AMD 104 is, how far the AMD 104 has moved, the presence of obstacles, where those obstacles are, and so forth.

The mapping module uses a simultaneous localization and mapping (SLAM) module. Localization is determining where the AMD 104 is in the physical space 190 and may utilize some external reference. For example, cameras may acquire images. These images are processed to determine the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

While the AMD 104 is moving, the SLAM module may provide as output a series of poses, each pose describing a location and rotations in the physical space 190. Each pose is based at least in part on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 190 may be determined. At successive times, and as the AMD 104 moves and additional images are acquired from locations in the physical space 190, the apparent change in position of the same feature across the additional images may be used to determine subsequent poses. In some implementations, an orientation may comprise information about six dimensions (6D), that of three orthogonal axes and corresponding rotations about those axes.

The SLAM module may also use data from other sensors 124 such as motor encoders, inertial measurement units (IMU) with one or more accelerometers and gyroscopes, and so forth. For example, inertial data indicative of rotations, accelerations along particular axes, and so forth obtained from the IMU may be integrated to provide information about the movement of the AMD 104.

A set of poses generated by the SLAM module over time may describe a given AMD 104 trajectory. For example, trajectory data may comprise a time series of pose data from the SLAM module.

While the AMD 104 is operating, the sensors 124 may be used to acquire sensor data 126 comprising information about the physical space 190. In addition to cameras, the AMD 104 may include depth sensors that may determine depth data about the presence or absence of obstacles in the physical space 190, and so forth. For example, the sensors 124 may comprise a time-of-flight (TOF) depth camera, ultrasound, radar, and so forth. The depth data is indicative of whether an obstacle is detected or not and includes information about the distance between the sensor 124 and the obstacle and relative direction with respect to the sensor 124 of an obstacle, if detected.

The sensor data 126 may be processed to determine occupancy data. The occupancy data is indicative of a particular area in the physical space 190, relative to the pose of the AMD 104 at the time the sensor data 126 was acquired, and whether that area contains an obstacle or is determined to be free from obstacles.

The occupancy map may be manually or automatically determined as part of an exploration process. This exploration may include an explicit exploration in which the AMD 104 moves through the physical space 190 or may be incidental exploration to movement of the AMD 104. For example, explicit exploration may involve the AMD 104 starting with no occupancy map and moving throughout the physical space 190 to determine occupancy data and the corresponding occupancy map. In another example incidental exploration may involve the AMD 104 following the user 102. Continuing the example, during a learning phase the user 102 may take the AMD 104 on a tour of the physical space 190, allowing the mapping module of the AMD 104 to determine occupancy data and the corresponding occupancy map. The user may provide input data 128 such as tags or other semantic data that designates a particular obstacle type, such as "furniture" or "fragile". In another example, during subsequent operation, the AMD 104 may generate the occupancy map that is indicative of locations and types of obstacles such as chairs, doors, stairwells, and so forth as it moves unattended through the physical space 190.

Modules described herein, such as the mapping module, may provide various processing functions such as de-noising, filtering, and so forth. Processing of sensor data 126, such as image data 184 from a camera, may be performed by a module implementing, at least in part, one or more of the following tools or techniques. In one implementation, processing of image data 184 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 126. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 126 or other data. For example, the ANN may be trained using a supervised learning algorithm such that object identifiers are associated with images of particular objects within training images provided to the ANN. Once trained, the ANN may be provided with the sensor data 126 and produce output indicative of the object identifier.

A navigation map module uses the occupancy map as input to generate a navigation map. For example, the navigation map module may produce the navigation map by inflating or enlarging the apparent size of obstacles 110 as indicated by the occupancy map.

The autonomous navigation module 164 provides the AMD 104 with the ability to navigate within the physical space 190 without real-time human interaction. The autonomous navigation module 164 may implement, or operate in conjunction with, the mapping module to determine one or more of the occupancy map, the navigation map, or other representations of the physical space 190. The autonomous navigation module 164 is discussed in more detail with regard to FIG. 2.

The AMD 104 autonomous navigation module 164 may generate path plan data that is indicative of a path through the physical space 190 from the current location to a destination location. The AMD 104 may then begin moving along the path.

While moving along the path, the AMD 104 may assess the physical space 190 and update or change the path as appropriate. For example, if an obstacle appears in the path, the mapping module may determine the presence of the obstacle as represented in the occupancy map and navigation map. The now updated navigation map may then be used to plan an alternative path to the destination location.

The AMD 104 may utilize one or more task modules 166. The task module 166 comprises instructions that, when executed, provide one or more functions. The task modules 166 may perform functions such as finding a user 102, following a user 102, presenting output on output devices 168 of the AMD 104, performing sentry tasks by moving the AMD 104 through the physical space 190 to determine the presence of unauthorized people, and so forth.

The AMD 104 includes one or more output devices 168, such as one or more of a motor 116, light, speaker, display, projector, printer, and so forth. The one or more output devices 168 may be used to provide output during operation of the AMD 104. The output devices 168 are discussed in more detail with regard to FIG. 3.

The AMD 104 may use the network interfaces 120 to connect to a network 174. For example, the network 174 may comprise a wireless local area network, that in turn is connected to a wide area network such as the Internet.

The docking station 108 may also be connected to the network 174. For example, the docking station 108 may be configured to connect to the wireless local area network 174 such that the docking station 108 and the AMD 104 may communicate.

The AMD 104 may access one or more servers 170 via the network 174. For example, the AMD 104 may utilize a wakeword detection module to determine if the user 102 is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user 102 to one or more servers 170 for further processing. The servers 170 may process the spoken audio and return to the AMD 104 data that may be subsequently used to operate the AMD 104.

The AMD 104 may also communicate with other devices 176. The other devices 176 may include one or more devices that are within the physical space 190 such as a home or associated with operation of one or more devices in the physical space 190. For example, the other devices 176 may include a doorbell camera, a garage door opener, a refrigerator, washing machine, and so forth. In some implementations the other devices 176 may include other AMDs 104, vehicles, and so forth.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

Figure 2:
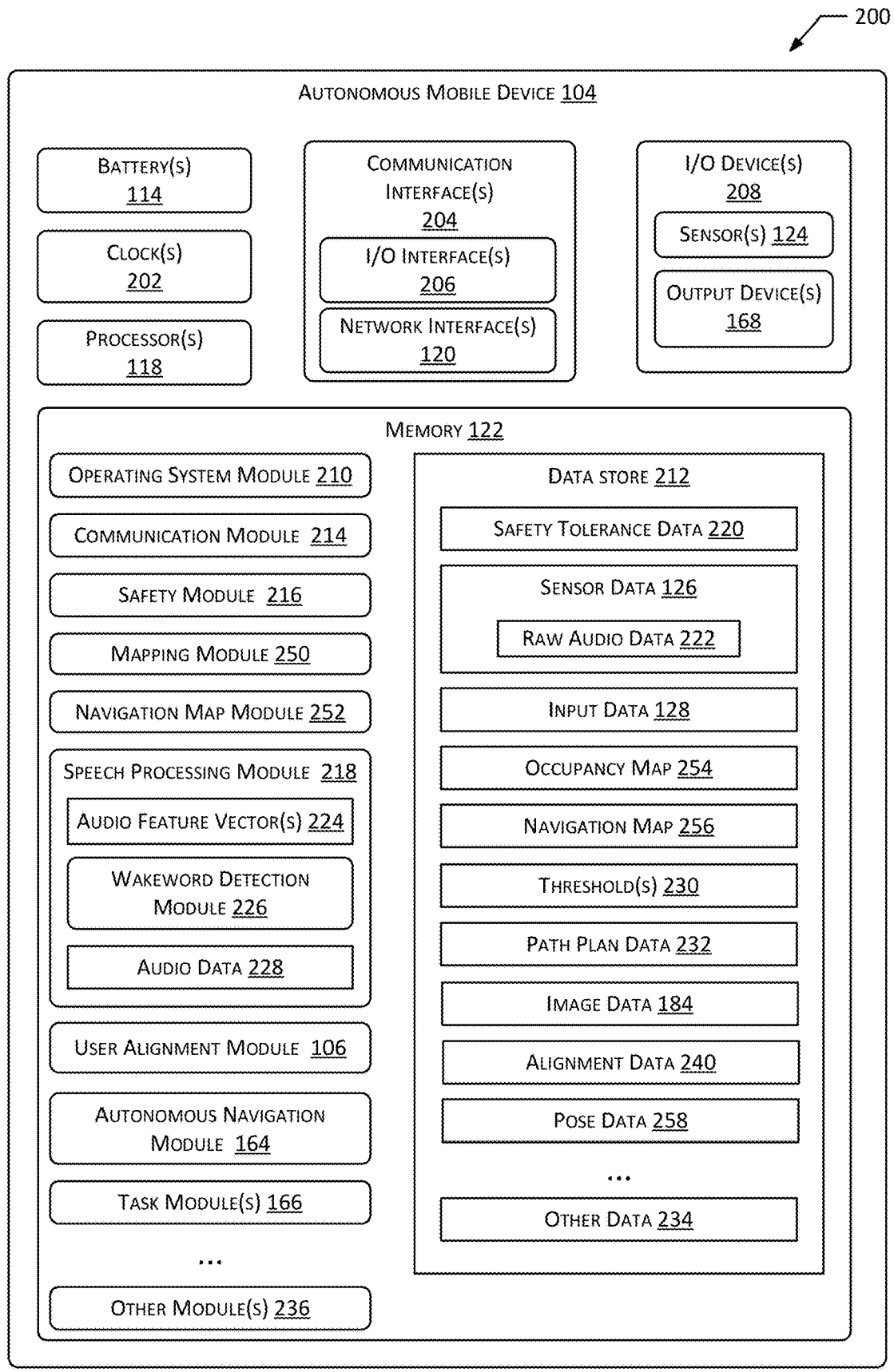
FIG. 2 is a block diagram of the components of the AMD, according to some implementations.

FIG. 2 is a block diagram 200 of the components of the AMD 104, according to some implementations. The AMD 104 may include one or more batteries 114 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 118 may use data from the clock 202 to associate a particular time with an action, sensor data 126, and so forth.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 120, and so forth. The communication interfaces 204 enable the AMD 104, or components thereof, to communicate with other devices 176 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 124, keyboard, mouse, scanner, and so forth. The I/O devices 208 may also include output devices 168 such as one or more of a motor 116, light, speaker, display, projector, printer, and so forth. In some embodiments, the I/O devices 208 may be physically incorporated with the AMD 104 or may be externally placed.

The network interfaces 120 may be configured to provide communications between the AMD 104 and other devices 176 such as other AMDs 104, docking stations 108, routers, access points, and so forth. The network interfaces 120 may include devices configured to couple to personal area networks (PANS), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth. The AMD 104 may also include one or more busses or other internal communications hardware or software that allow for the transfer of data between the various modules and components of the AMD 104.

As shown in FIG. 2, the AMD 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the AMD 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 176 including other AMDs 104, servers 170, network attached storage devices, and so forth.

A communication module 214 may be configured to establish communication with other devices 176, such as other AMDs 104, an external server 170, a docking station 108, and so forth. The communications may be authenticated, encrypted, and so forth.

Other modules within the memory 122 may include a safety module 216, the mapping module 250, the navigation map module 252, the autonomous navigation module 164, the one or more task modules 166, a speech processing module 218, or other modules 236. The modules may access data stored within the data store 212, including safety tolerance data 220, sensor data 126, other data 234, and so forth.

The safety module 216 may access the safety tolerance data 220 to determine within what tolerances the AMD 104 may operate safely within the physical space 190. For example, the safety module 216 may be configured to stop the AMD 104 from moving when an extensible mast of the AMD 104 is extended. In another example, the safety tolerance data 220 may specify a minimum sound threshold which, when exceeded, stops all movement of the AMD 104. Continuing this example, detection of sound such as a human yell would stop the AMD 104. In another example, the safety module 216 may access safety tolerance data 220 that specifies a minimum distance from an object that the AMD 104 is to maintain. Continuing this example, when a sensor 124 detects an object has approached to less than the minimum distance, all movement of the AMD 104 may be stopped. Movement of the AMD 104 may be stopped by one or more of inhibiting operations of one or more of the motors 116, issuing a command to stop motor operation, disconnecting power from one or more the motors 116, and so forth. The safety module 216 may be implemented as hardware, software, or a combination thereof.

The safety module 216 may control other factors, such as a maximum speed of the AMD 104 based on information obtained by the sensors 124, precision and accuracy of the sensor data 126, and so forth. For example, detection of an object by an optical sensor may include some error, such as when the distance to an object comprises a weighted average between the object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

The navigation map module 252 uses the occupancy map 254 as input to generate the navigation map 256. The navigation map module 252 may produce the navigation map 256 to inflate or enlarge the obstacles 110 indicated by the occupancy map 254. One or more inflation parameters may be used during operation. The inflation parameters provide information such as inflation distance, inflation adjustment values, and so forth. In some implementations the inflation parameters may be based at least in part on the sensor FOV 192, sensor blind spot, physical dimensions of the AMD 104, and so forth.

The speech processing module 218 may be used to process utterances of the user 102. Microphones may acquire audio in the presence of the AMD 104 and may send raw audio data 222 to an acoustic front end (AFE). The AFE may transform the raw audio data 222 (for example, a single-channel, 16-bit audio stream sampled at 16 kHz), acquired by the microphone, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 104 for output. For example, the AMD 104 may be playing music or other audio that is being received from a network 174 in the form of output audio data. To avoid the output audio interfering with the device's ability to detect and process input audio, the AFE or other component may perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching being conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 222 or the audio feature vectors 224) to one or more server(s) 170 for speech processing. The audio data 228 corresponding to audio obtained by the microphone may be processed locally on one or more of the processors 118, sent to a server 170 for routing to a recipient device or may be sent to the server 170 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 252, prior to sending to the server 170, and so forth.

The speech processing module 218 may include or access an automated speech recognition (ASR) module. The ASR module may accept as input raw audio data 222, audio feature vectors 224, or other sensor data 126 and so forth and may produce as output the input data 128 comprising a text string or other data representation. The input data 128 comprising the text string or other data representation may be processed by the navigation map module 252 to determine the command to be executed. For example, the utterance of the command "robot, come here" may result in input data 128 comprising the text string "come here". The wakeword "robot" may be omitted from the input data 128.

The autonomous navigation module 164 provides the AMD 104 with the ability to navigate within the physical space 190 without real-time human interaction. The autonomous navigation module 164 may implement, or operate in conjunction with, the mapping module 250 to determine the occupancy map 254, the navigation map 256, or other representation of the physical space 190. In one implementation, the mapping module 250 may use one or more simultaneous localization and mapping ("SLAM") techniques. The SLAM algorithms may utilize one or more of maps, algorithms, beacons, or other techniques to navigate. The autonomous navigation module 164 may use the navigation map 256 to determine a set of possible paths along which the AMD 104 may move. One of these may be selected and used to determine path plan data 232 indicative of a path. For example, a possible path that is the shortest or has the fewest turns may be selected and used to determine the path. The path is then subsequently used to determine a set of commands that drive the motors 116 connected to the wheels. For example, the autonomous navigation module 164 may determine the current location within the physical space 190 and determine path plan data 232 that describes the path to a destination location such as the docking station 108.

The autonomous navigation module 164 may utilize various techniques during processing of sensor data 126. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 118, in response to a command received from one or more communication interfaces 204, as determined from the sensor data 126, and so forth. For example, an external server 170 may send a command that is received using the network interface 120. This command may direct the AMD 104 to proceed to find a particular user, follow a particular user, and so forth. The AMD 104 may then process this command and use the autonomous navigation module 164 to determine the directions and distances associated with carrying out the command. For example, the command to "come here" may result in the task module 166 sending a command to the autonomous navigation module 164 to move the AMD 104 to a particular location near the user and orient the AMD 104 in a particular direction.

The AMD 104 may connect to the network 174 using one or more of the network interfaces 120. In some implementations, one or more of the modules or other functions described here may execute on the processors 118 of the AMD 104, on the server 170, or a combination thereof. For example, one or more servers 170 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store the other data 234 as well. For example, localization settings may indicate local preferences such as language, user identifier data may be stored that allows for identification of a particular user, and so forth.

Figure 3:
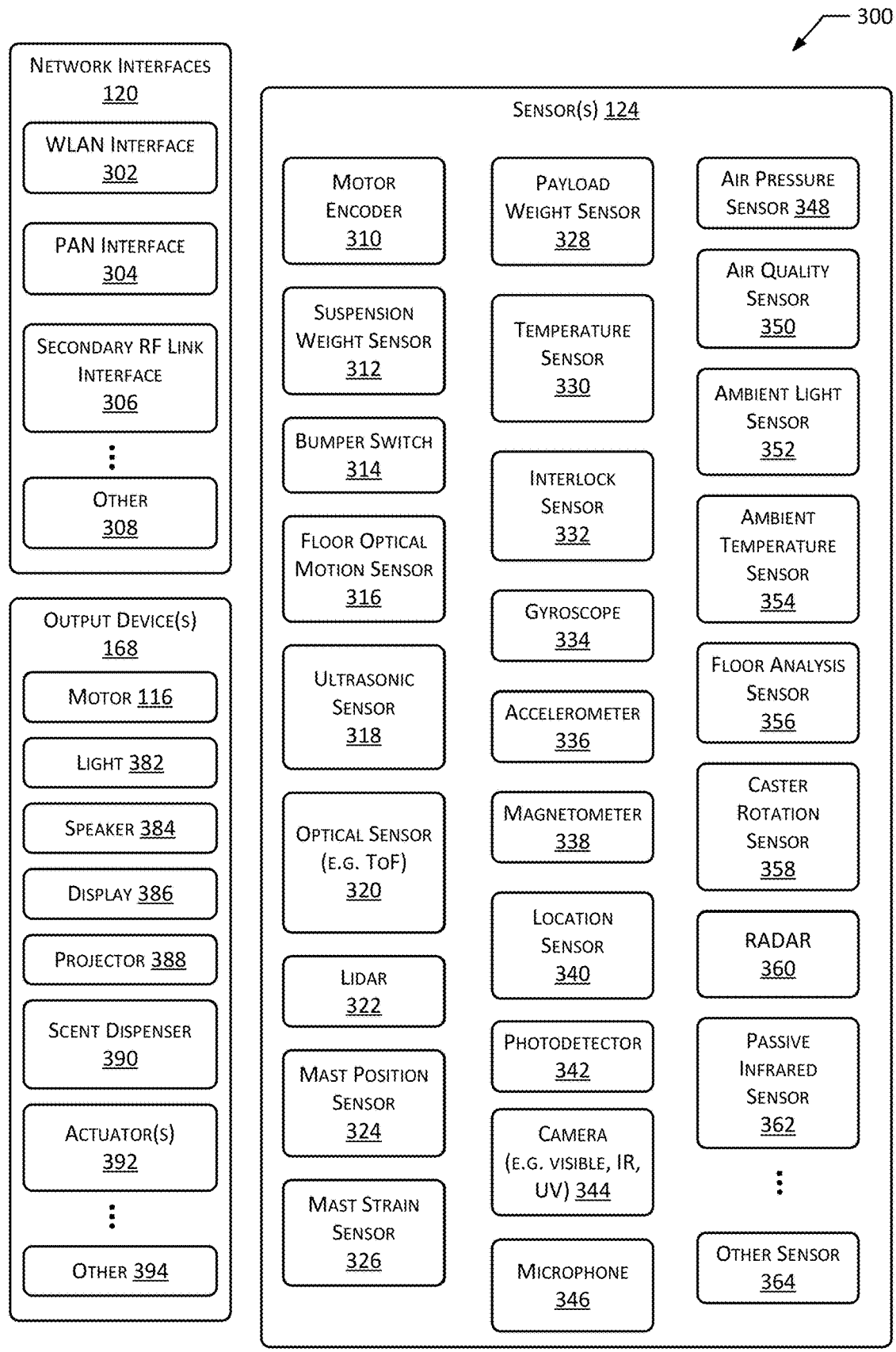
FIG. 3 is a block diagram of some components of the AMD, such as network interfaces, sensors, and output devices, according to some implementations.

FIG. 3 is a block diagram 300 of some components of the AMD 104 such as network interfaces 120, sensors 124, and output devices 168, according to some implementations. The components illustrated here are provided by way of illustration and not necessarily as a limitation. For example, the AMD 104 may utilize a subset of the particular network interfaces 120, output devices 168, or sensors 124 depicted here, or may utilize components not pictured. One or more of the sensors 124, output devices 168, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 176 in the event that communication fails using one or more of the WLAN interface 302 or the PAN interface 304. For example, in the event the AMD 104 travels to an area within the physical space 190 that does not have Wi-Fi coverage, the AMD 104 may use the secondary RF link interface 306 to communicate with another device such as a specialized access point, docking station 108, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 124. The sensors 124 depicted here are provided by way of illustration and not necessarily as a limitation. It is understood that other sensors 124 may be included or utilized by the AMD 104, while some sensors 124 may be omitted in some configurations.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In other implementations, the motor encoder 310 may comprise circuitry configured to drive the motor 116. For example, the autonomous navigation module 164 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 116. For example, if the suspension weight sensor 312 indicates no weight on the suspension, the implication is that the AMD 104 is no longer resting on its wheels, and thus operation of the motors 116 may be inhibited. In another example, if the suspension weight sensor 312 indicates weight that exceeds a threshold value, the implication is that something heavy is resting on the AMD 104 and thus operation of the motors 116 may be inhibited. For example, the threshold value may comprise a weight of a load that compresses a suspension system to a minimum height, or results in a mass that exceeds a torque output of the motors 116 to maintain a minimum acceleration.

One or more bumper switches 314 provide an indication of physical contact between a bumper or other member that is in mechanical contact with the bumper switch 314. The safety module 216 utilizes sensor data 126 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 126 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 124 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 164 may utilize the sensor data 126 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 126 may be generated that is indicative of the presence of objects and the relative positions, shapes, and so forth that are visible to the lidar 322. Data from the lidar 322 may be used by various modules. For example, the autonomous navigation module 164 may utilize point cloud data generated by the lidar 322 for localization of the AMD 104 within the physical space 190.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 216 may utilize sensor data 126 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 114, one or more motors 116, and so forth. In the event the temperature exceeds a threshold value, the component associated with that device temperature sensor 330 may be shut down. For example, the threshold value may be determined based on component specifications, such as a maximum permissible temperature of the batteries 114.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 126 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 126 indicative of impinging light. For example, the photodetector 342 may provide data indicative of a color, intensity, duration, and so forth.

A camera 344 generates sensor data 126 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 126 comprising images being sent to the autonomous navigation module 164. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 164 may be acquired using a rolling shutter and subsequently may be processed to mitigate image artifacts.

One or more microphones 346 may be configured to acquire information indicative of sound present in the physical space 190. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 190 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 164, the task module 166, and so forth. For example, if the floor analysis sensor 356 determines that the floor is wet, the safety module 216 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 124 may include a radar 360. The radar 360 may be used to provide information as to a distance, lateral position, and so forth, to an object.

The sensors 124 may include a passive infrared (PIR) sensor 362. The PIR 362 sensor may be used to detect the presence of users, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 190 to provide landmarks for the autonomous navigation module 164. One or more touch sensors may be utilized to determine contact with a user or other objects.

The AMD 104 may include one or more output devices 168. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 116 with an eccentric weight may be used to create a buzz or vibration to allow the AMD 104 to simulate the purr of a cat.

Figure 4:
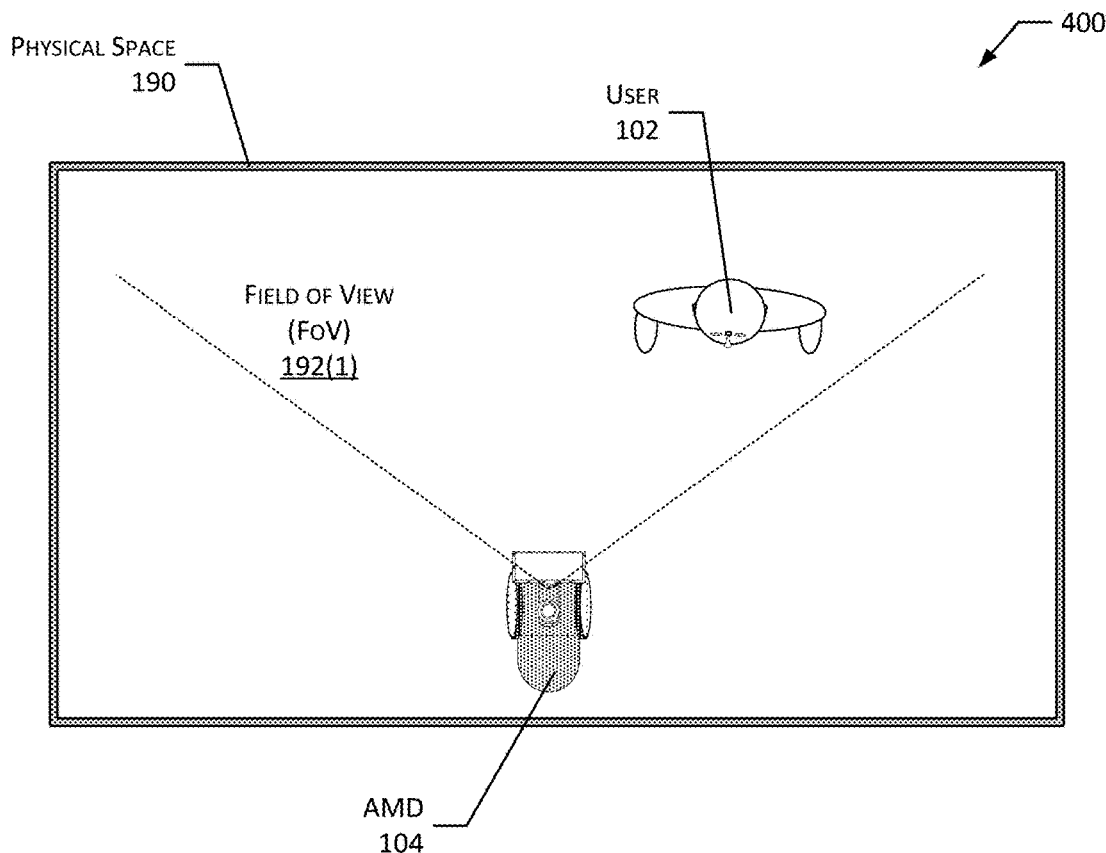
FIG. 4 illustrates an AMD within a physical space acquiring and analyzing image data, according to some implementations.
Figure 4:
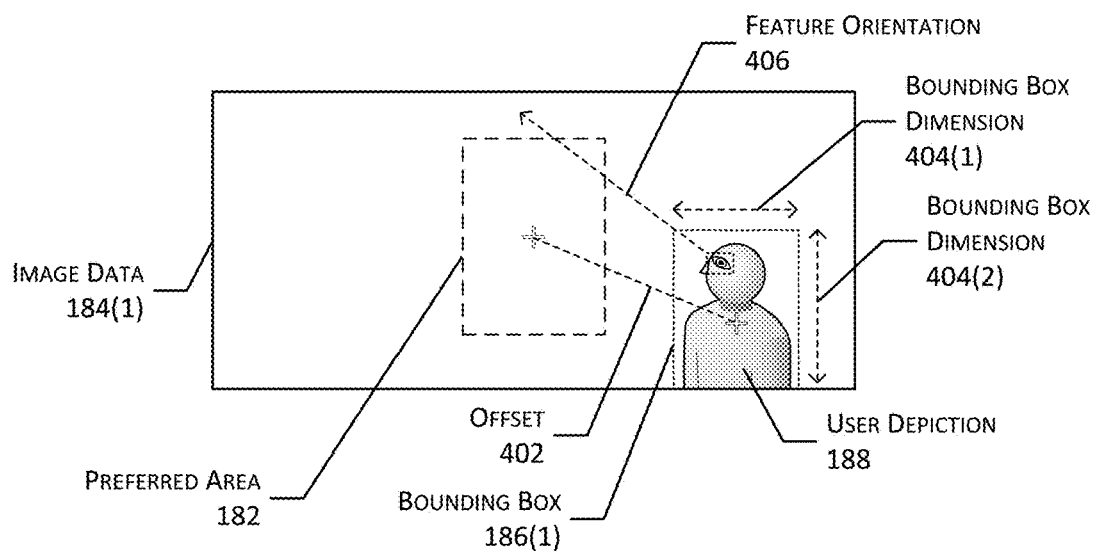

FIG. 4 illustrates at 400, the AMD within a physical space 190 acquiring and analyzing image data 184, according to some implementations.

This illustration depicts a physical space 190 that includes a user 102 and the AMD 104. In this example, the AMD 104 may acquire and analyze image data 184(1) using the user alignment module 106. The user alignment module 106 may determine one or more image features, including: an offset 402 between a preferred area 182 and the bounding box 186(1), feature orientation 406, and bounding box dimensions 404. As depicted, feature orientation 406 is based on facial feature orientation. However, in other examples, feature orientation may be based on other, or additional, features or landmarks detected for a user depiction 188. For example, the user alignment module 106 may use only facial features, only body features from a torso of a user depiction 188, or both facial features and body features. Facial features and body features are described below with respect to FIG. 9. Feature orientation 406 may be used to build a three-dimensional model that includes the user 102 oriented in the three-dimensional model based on the feature orientation 406. Projecting or correlating the three-dimensional model to the physical space 190 may then be used as a basis for determine a physical configuration for the AMD 104.

As depicted in FIG. 4, the bounding box 186(1) is relative to the user depiction 188, however, in other examples, instead of a user 102, the AMD 104 may perform tasks relative to objects. For example, the AMD 104 may be given a task to find an object, such as a specific book, keys, a toy, or any other type of physical object. In these examples, detection of an object within image data 184 may be used for generating a bounding box 186 around the object, where, similar to bounding boxes 186 around user depictions 188, the AMD 104 may determine physical configurations in response to bounding box locations of object depictions within image data 184. An additional example with regard to objects is provided below with respect to FIG. 12.

In this example, the AMD 104 may move into a different physical configuration even if a user 102 is not moving within the physical space 190. The different physical configuration may result in the AMD 104 being better situated to provide any of the services described above.

The user alignment module 106, based on the one or more image features of image data 184(1), may determine a physical configuration indicating one or more of: a vector for moving the AMD 104 within a physical space 190, an orientation for a camera mounted on the AMD 104, or an orientation for a display mounted on the AMD 104. In some examples, a vector for moving the AMD may specify one or more of: a direction, a distance, a velocity, or acceleration.

The user alignment module 106 may determine image features of image data 184(1), including one or more of: offset 402, feature orientation 406, bounding box 186(1), or bounding box dimensions 404. The user alignment module 106 may then provide the image features to a machine learning system that has been trained to generate physical configurations given image data 184 indicating one or more of: a preferred area 182, a bounding box location, bounding box dimensions 404, feature orientation 406, or an offset 402. The machine learning system may be trained by various traditional machine learning techniques that may train on the inputs, generated output physical configurations, and a success value that is determined by how close a given generated output physical configuration comes to causing a subsequent image to include a bounding box 186(1) for a depicted user 188 that is within the preferred area 182. In this way, the machine learning system may be repeatedly improved and updated as the AMD 104 interacts with and responds to movements of a user 102 within a physical space 190. In some examples, the machine learning system may be trained locally on the AMD 104, and in other examples, training the machine learning system may be performed remotely on one or more servers 170.

In some implementations the user alignment module 106 may generate physical configuration information that may be directly provided to one or more actuators in the form of velocity values, acceleration values, and control information for navigating the AMD 104 in a particular direction.

Image data 184(1) may be generated by the AMD 104 acquiring an image. The image data 184(1) may specify boundaries or dimensions that define a size and shape of the image data 184(1), where the size may be specified by a length and width as measured in pixels or as measured using length measurements such centimeters. The user alignment module 106 may analyze the image data 184(1) to identify a user depiction 188 of the user 102. Identifying a depiction 188 of a user 102 may be based on providing image data 184(1) to a feature detection algorithm. The feature detection algorithm may be implemented by a feature detection module, where the feature detection algorithm may be provided by one or more traditional techniques.

The bounding box 186(1) may be determined by the user alignment module 106 analyzing the image data 184(1) to detect the user depiction 188. The bounding box 186(1) may be determined by defining width and height dimensions of a rectangular area within the image data 184(1). The bounding box 186(1) may also be specified by a location or pixel coordinates within the image data 184(1). Dimensions of areas and locations of areas of the image data 184(1) may be specified by pixels, where boundaries or size of image data 184(1) may be any of various standard dimensions or sizes.

Bounding box dimensions 404 for the bounding box 186(1) may be based on a rectangular area that is determined to include most or all of the pixels that correspond to the user depiction 188. Bounding box dimension 404(1) may indicate a width value and the bounding box dimension 404(2) may indicate a height value. Bounding box dimensions 404 and location information may be stored within alignment data 240, depicted in FIG. 2.

Feature orientation 406 may be based on the feature detection module analyzing the user depiction 188 to determine features of a user 102, including a face, body, or both. The feature detection module may determine a feature orientation 406 based on detection of multiple features, determining planes and orientations of the planes, and extruding a normal from a plane corresponding to, say, a user's eyes and forehead. The feature orientation 406 may correspond to this normal, where the feature orientation 406 is used to determine a two-dimension direction that is being looked at by the user 102. The two-dimensional coordinates specify the floor of the physical space 190. The feature orientation 406 may be used by the user alignment module 106 to determine an adjustment to a physical configuration specifying an AMD vector. This adjustment to the physical configuration may result in moving the AMD 104 to acquire subsequent image data 184 where the bounding box 186(1) of the depicted user 102 is closer to the preferred area 182.

Offset 402 may be a value measuring a distance between a center point within the preferred area 182 and a center point within the bounding box 186(1). The offset 402 may be measured in pixels or a length measurement. In the case where the offset 402 is small enough that the bounding box 186(1) is within or substantially within the preferred area 182, the AMD 104 physical configuration may not generate the AMD vector. In the case where the offset 402 is large enough that the bounding box 186(1) is not within the preferred area 182, the physical configuration generated may indicate a direction value for the AMD 104 that improves the location of the bounding box 186 in a next image. The offset 402 may be used by the user alignment module 106 to determine an adjustment to a physical configuration indicating the AMD vector indicating a direction value for moving, where the physical configuration may result in moving the AMD 104 to acquire subsequent image data 184 where the bounding box 186(1) of the depicted user 102 is closer to the preferred area 182.

In some implementations, image-based control of the AMD 104 may be based on using a proportional-integral-derivative (PID) controller to derive physical configurations from calculated offsets. The physical configurations may specify the orientation of a camera, such as a specific pan or tilt or such as a specific physical location to move toward or rotate toward. A PID controller is a control loop mechanism that uses feedback from an image analysis to minimize an error value, where the image analysis may generate an offset 402, and where minimizing the error value may be done by minimizing the offset 402. In this example, the error value, e(t), may be calculated as a difference between a desired setpoint, r(t), and a measured process variable, y(t), where the PID controller applies a correction based on a proportion, integral, and derivative terms. The PID controller minimizes the error over time by adjustment of a control variable, u(t), such as by adjusting one or more values of a physical configuration of the AMD 104, to a new value determined by a weighted sum of terms. In the following control function, $K_p$, $K_i$, and $K_d$, represent coefficients for the proportional, integral, and derivative terms, respectively:

$$u(t) = K_p e(t) + K_i \int_0^t e(t') dt' + K_d \frac{de(t)}{dt}.$$

In this example, the feedback loop includes application of the control function, u(t), output to the AMD 104, determining an updated process variable, y(t), determining an updated error function as a difference between r(t) and y(t), and repeating this process until the error function is acceptable. In this example, the error function is acceptable based on the bounding box being within the preferred area or the offset 402 being within a threshold error tolerance value.

In some implementations, using image-based control of the AMD 104, image data 184 may be analyzed in terms of minimizing an error function, where the error function measures a difference between a vector, m(t), that is a set of image measurements, such as a bounding box, and a vector that includes the desired values of the features, such as a preferred area. With respect to FIG. 4, the error function may be minimized by minimizing the offset 402.

The error function may be specified by e(t)=s(m(t), a)−s* (equation 1), where image data measurements may be used to calculate a vector of k visual features, s(m(t), a), where a is a set of parameters that represents potential additional knowledge, such as camera parameters. In this example, a user 102 may be in a single physical location 190, and the AMD 104 calculates a desired physical configuration to minimize the error function. Given this representation, s* may be considered constant, and changes in s depend only on motion of the camera or the AMD 104. Given s, a motion controller of the AMD 104 may use a relationship between time variation of s and camera or AMD 104 velocity.

For simplicity, motion of the AMD 104 is described, but in other examples, the camera may move in addition to or instead of the AMD 104 moving. In this example, spatial velocity of the AMD 104 may be specified by $v_f=(v_c,\omega_c)$, where $v_c$ specifies instantaneous linear velocity of the AMD 104, and $\omega_c$ specifies instantaneous angular velocity of the AMD 104. The relationship between ṡ and $v_c$ is specified by $\dot{s}=L_s v_c$ (equation 2), where $L_s \in R^{k \times 6}$ is an interaction matrix related to s. Using equation 1 and equation 2, a relationship between the AMD 104 velocity and a time variation of error is specified by $\dot{e}=L_e v_c$ (equation 3), where $L_e=L_s$.

In this example, $v_c$ is an input to the autonomous navigation module 164, and decrease of the error, $\dot{e}=-\lambda e$, yields $v_c=-L_r^+ e$ (equation 4), where $L_r^+ \in R^{6 \times k}$ is specified as a Moore-Penrose pseudoinverse of $L_e$. In this example, $L_e^+ = (L_e^T L_e)^{-1} L_e^T$ when $L_e$ is of full rank 6. This allows $\|\dot{e}-\lambda L_e L_e^+ e\|$ and $\|v_c\|$ to be minimal. At the point where k=6, if det $L_e \neq 0$ it is possible to invert $L_e$, which results in $v_c=-L_e^{-1} e$.

In this example, an approximation of both $L_e$ and $L_e^+$ is used. Both the pseudoinverse of the approximation of the interaction matrix and the approximation of the pseudoinversion of the interaction matrix are specified by $\widehat{L}_e^+$, where using this notation, a control law for the AMD 104 is specified by $v_c=-\lambda \widehat{L}_e^+ e$ (equation 5). In this example, remaining are selections for estimating $\widehat{L}_e^+$.

With respect to an interaction matrix, for a 3-D point with coordinates X=(X, Y, Z) in the camera frame, which projects in the image data 184 as a 2-D point with coordinates Y), we have:

$$\begin{cases} x = X/Z = (u-c_u)/f\alpha \\ y = Y/Z = (v-c_v)/f, \end{cases} \quad \text{(equation 6)}$$

In equation 6, m===(u, v) provides coordinates of the image point expressed in pixel units, and a=($c_u,c_v,f,\alpha$) is a set of camera intrinsic parameters: $c_u$ and $c_v$ are coordinates of a principal point, f is the focal length, and α is a ratio of the pixel dimensions. In this example, s=x=(x,y), the image plane coordinates of the point.

By taking the time derivative of the projection equations, equations 6, the result is equation 7:

$$\begin{cases} \dot{x} = \dot{X}/Z - X\dot{Z}/Z^2 = (\dot{X} - x\dot{Z})/Z \\ \dot{y} = \dot{Y}/Z - Y\dot{Z}/Z^2 = (\dot{Y} - y\dot{Z})/Z. \end{cases}$$

The velocity of the 3-D point to the AMD 104 spatial velocity may be related by using the following equation 8:

$$\dot{X} = -v_c - \omega_c \times X \Leftrightarrow \begin{cases} \dot{X} = -v_x - \omega_y Z + \omega_z Y \\ \dot{Y} = -v_y - \omega_z X + \omega_x Z \\ \dot{Z} = -v_z - \omega_x Y + \omega_y X. \end{cases}$$

In this example, by injecting equation 8 into equation 7, and grouping terms, the result is equation 9:

$$\dot{x} = v_x/Z + xv_z/Z + xy\omega_x - (1+x^2)\omega_y + y\omega_z$$

$$\dot{y} = v_y/Z + yv_z/Z + (1+y^2)\omega_x - xy\omega_y - x\omega_z$$

In this example, equation 9 may be written as $\dot{x} = L_x v_c$ (equation 10), where the interaction matrix $L_x$ related to x is described in equation 11 as:

$$L_x = \begin{bmatrix} \frac{-1}{Z} & 0 & \frac{x}{Z} & xy & -(1+x^2) & y \\ 0 & \frac{-1}{Z} & \frac{y}{Z} & 1+y^2 & -xy & -x \end{bmatrix}.$$

In the matrix $L_x$, the value of Z is a depth of the point relative to the AMD 104. Given the value of Z is an approximation, camera intrinsic properties are part of computation of x and y. Because of this approximation, $\hat{L}_x$ is used instead of $L_x$. To control the six degrees of freedom, three points from the feature vector, $x=(x_1,x_2,x_3)$, are used by stacking interaction matrices:

$$L_x = \begin{bmatrix} L_{x_1} \\ L_{x_2} \\ L_{x_3} \end{bmatrix}.$$

To approximate the interaction matrix, $\hat{L}_e^+ = L_c^+$ is used, where Z is a depth of each point, and where $L_e = L_x$.

Figure 5:
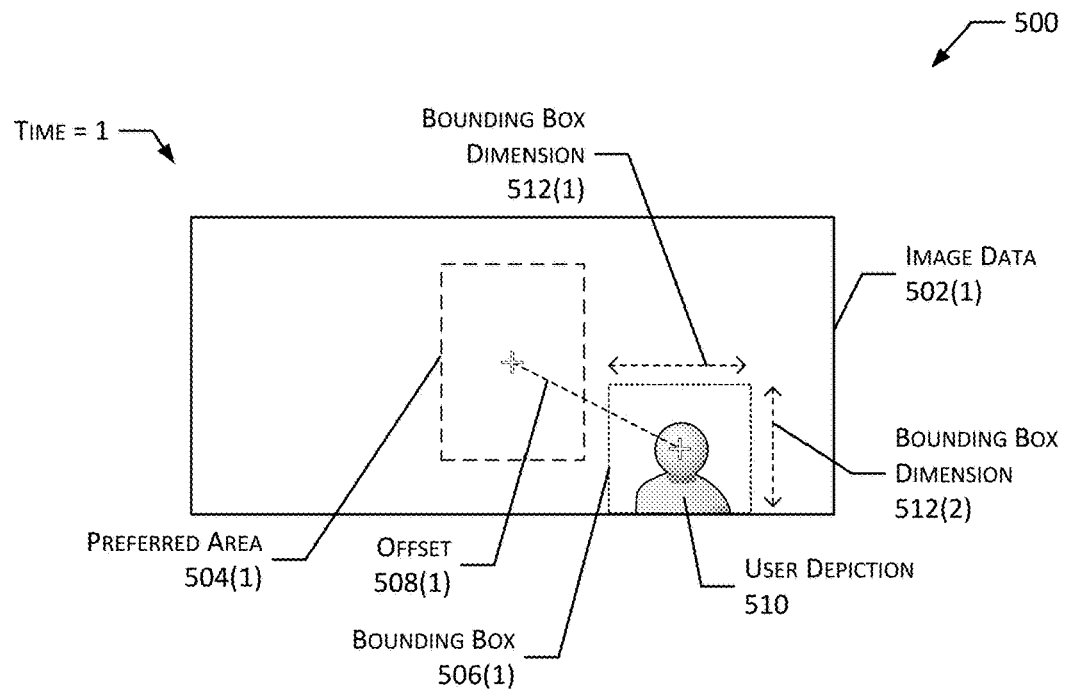
FIG. 5 illustrates an analysis of successive image data in determining a physical configuration for an AMD, according to some implementations.
Figure 5:
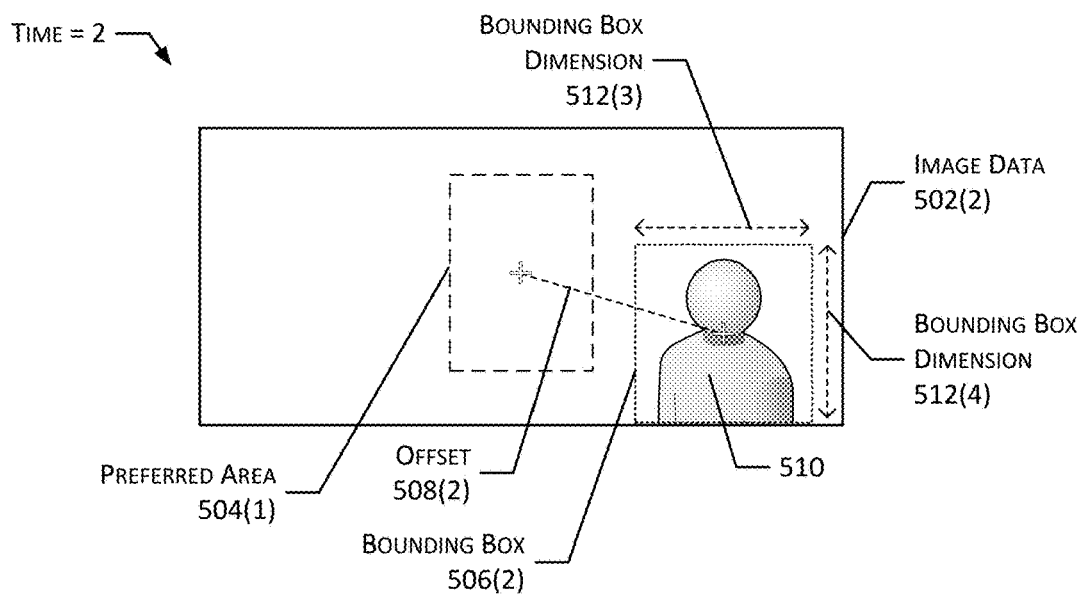

FIG. 5 illustrates at 500, an analysis of successive image data in determining a physical configuration for an AMD 104, according to some implementations.

In this example, the AMD 104 may move into a different physical configuration in response to a user 102 moving within a physical space 190, where a depiction of a user 102 in subsequent image data changes locations within image data 502. In this way, the AMD 104 may repeatedly update physical configurations to repeatedly move into a location or orientation where the AMD 104 is better situated to provide any of the services described above.

In this example, at a first time t=1, the AMD 104 generates image data 502(1) based on an acquired image, and at a second time t=2, the AMD 104 generates image data 502(2) based on an acquired image.

Given image data 502(1) and image data 502(2), the AMD 104 may repeatedly perform an image-based analysis, as described above with respect to FIG. 4.

An additional image feature may be generated in this example of a moving user 102. The additional image feature may measure a bounding box delta representing a change between bounding box dimensions 512 for a bounding box 506(1) in image data 502(1) and bounding box 506(2) in image data 502(2). Bounding box 506(1) has bounding box dimensions 512(1) and 512(2) and bounding box 506(2) has bounding box dimensions 512(3) and 512(4).

Using a change in bounding box dimensions 512, the AMD 104 may determine that a user 102 is moving closer to or farther away from the AMD 104. As a first example, if a bounding box for a user 102 depicted in image data from one image to a subsequent image becomes smaller, a determination is made that the user 102 is moving away from the AMD 104. As a second example, if a bounding box for a user 102 depicted in image data from one image to a subsequent image becomes larger, a determination is made that the user 102 is moving toward the AMD 104. As a third example, if a bounding box for a user 102 depicted in image data from one image to a subsequent image does not change, or changes below a specified threshold, a determination is made that the user 102 is not moving toward or away from the AMD 104.

At the first time, the AMD 104 may use the user alignment module 106 to analyze image data 502(1) to determine one or more image features, including one or more of: an offset 508(1) between a preferred area 504(1) and a bounding box 506(1), feature orientation of a user depiction 510, and bounding box dimensions 512 of the bounding box 506(1).

The user alignment module 106, using these image features, may determine a first physical configuration indicating one or more of: a vector for moving the AMD 104 within a physical space 190, an orientation for a camera mounted on the AMD 104, or an orientation for a display mounted on the AMD 104. The AMD 104 may then move to the first physical configuration.

At the second time t=2, the AMD 104 may also use the user alignment module 106 to analyze image data 502(2) to determine one or more image features, including one or more of: an offset 508(2) between a preferred area 504(1) and a bounding box 506(2), feature orientation of a user depiction 510, and bounding box dimensions 512 of the bounding box 506(2). Using the first bounding box dimensions 512(1,2) of the first image data 502(1), and the second bounding box dimensions 512(3,4) of the second image data 502(2), a bounding box delta may be calculated. The bounding box delta may be calculated as a difference between an area associated with the bounding box 506(1) and bounding box 506(2), where the area of bounding box 506(1) is based on bounding box dimensions 512(1) and 512(2), and where the area of bounding box 506(2) is based on bounding box dimensions 512(3) and 512(4).

The user alignment module 106, given these image features of the second image data 502(2) in addition to the bounding box delta, may determine a second physical configuration indicating one or more of: a vector for moving the AMD 104 within a physical space 190, an orientation for a camera mounted on the AMD 104, or an orientation for a display mounted on the AMD 104.

In this way, in generating a second physical configuration, the AMD 104 may use a difference in bounding box dimensions 512 indicating whether a user 102 is moving closer to or farther from the AMD 104.

Figure 6:
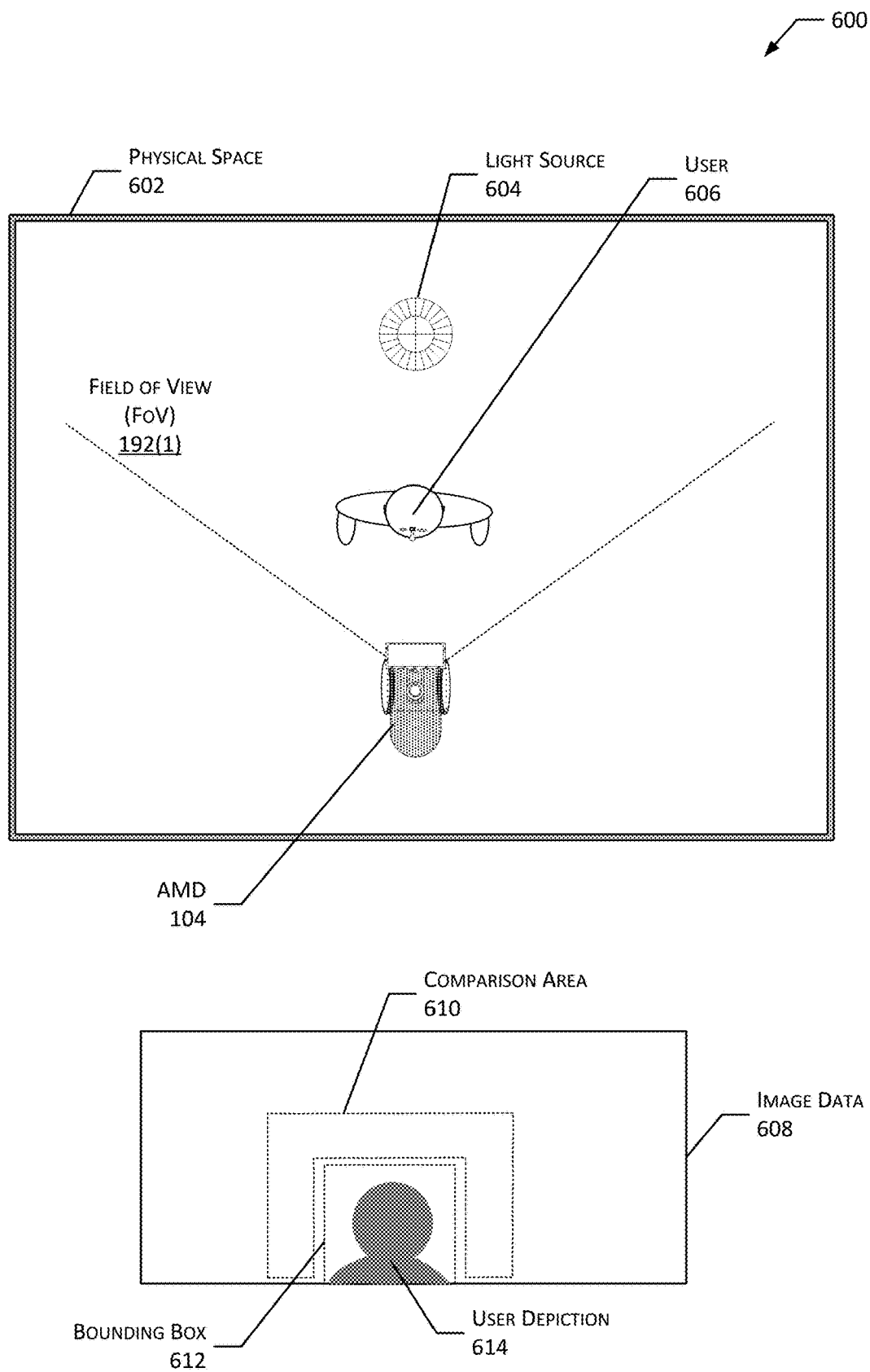
FIG. 6 illustrates an AMD detecting a user is backlit in an acquired image, according to some implementations.

FIG. 6 illustrates at 600, an AMD 104 detecting a user is backlit in an acquired image, according to some implementations.

In this example, the AMD 104 may share a physical space 602 with a user 606 and a light source 604, where the AMD 104 may detect that the user 606 is being backlit and generate a physical configuration that removes or reduces the backlighting. In this example, generating a physical configuration may be performed in conjunction with or independently of generating physical configurations to place depictions of a user within a preferred area, as described above with respect to FIGS. 4 and 5.

A backlighting condition may result in image data 608 that has a user depiction 614 that is a silhouette, or a partial silhouette, due to a light source 604 being behind the user 606, relative to the AMD 104. A backlighting condition may be detected by the AMD 104 based on comparing brightness values for pixels within a bounding box 612 of the user depiction 614 with brightness values for pixels within a comparison area 610 around the bounding box 612.

A bounding box 612 that includes the user depiction 614 may have an average pixel brightness that is less than an average pixel brightness of pixels within the comparison area 614, where the difference between average pixel brightness is greater than a specified threshold associated with a backlighting condition.

If a backlighting condition is detected, then based on the light source 604 being behind the user 606, the AMD 104 may determine a physical configuration that results in the light source 604 no longer being behind the user 606. For example, the AMD 104 may move in any direction that is not recognized to include an obstacle while maintaining at least a personal space distance from the user 606, where the subsequent physical configuration continues to frame a user depiction 614 within a preferred area of image data 608. A personal space distance may be specified as a default value, based on safety, or specified by a user.

In this way, the AMD 104 may detect a backlighting condition and generate a physical configuration to move to that reduces or eliminates the backlighting condition.

Figure 7:
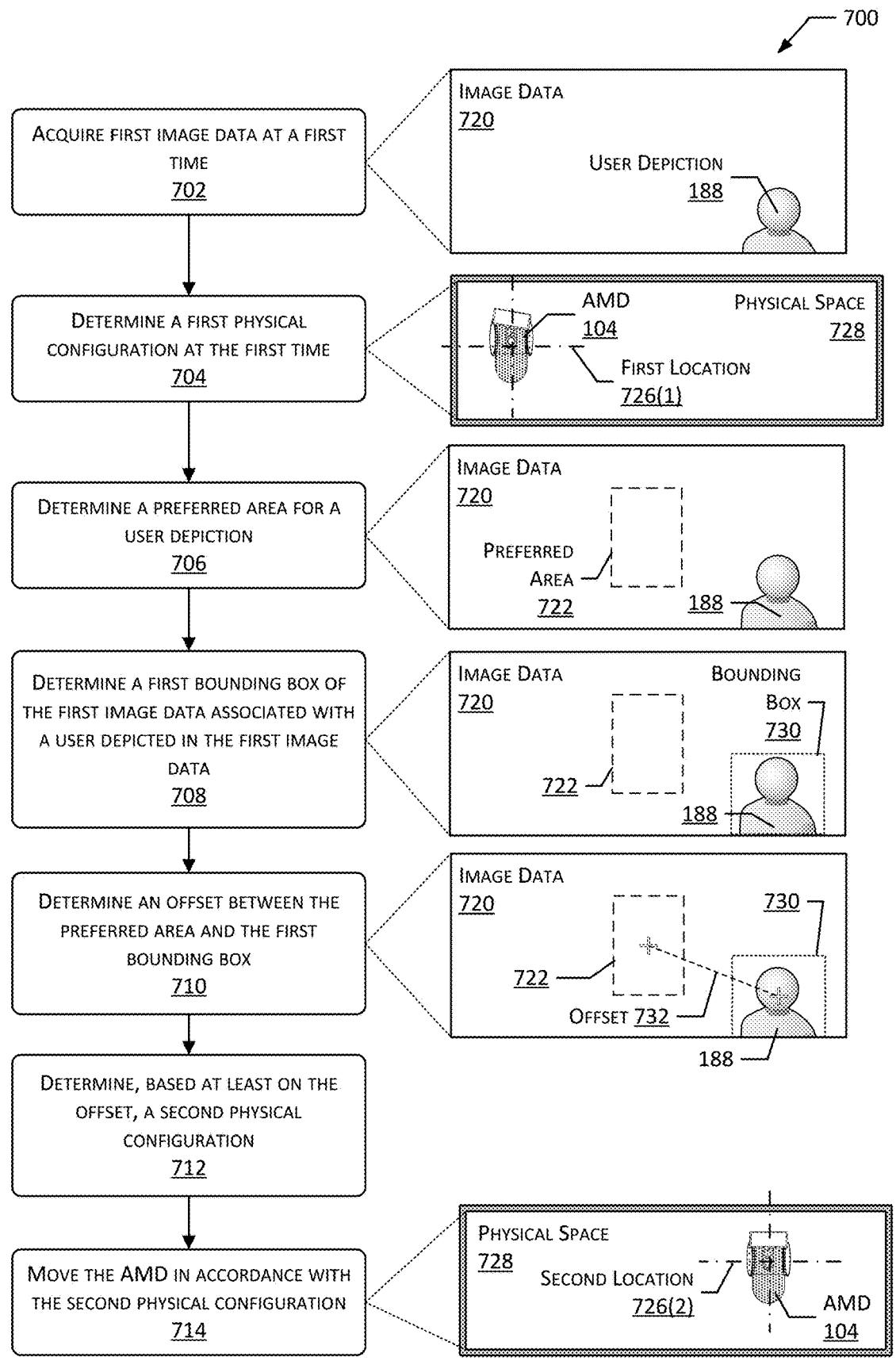
FIG. 7 is a flow diagram of a process to analyze image data to determine physical configurations of an AMD with respect to a user, according to some implementations.

FIG. 7 is a flow diagram 700 of a process to analyze image data to determine physical configurations of an AMD 104 with respect to a user, according to some implementations.

At 702, the AMD 104 acquires first image data 720 at a first time. The first image data 720 may be acquired by a camera mounted on a first portion of the AMD 104. The first image data 720 may comprise a first plurality of pixel data representative of an image of the physical space 728. The first portion of the AMD 104 onto which a camera is mounted may be a display screen that integrates the camera. In other examples, the first portion of the AMD 104 onto which a camera is mounted may be a portion of a housing for the AMD 104 or a mast.

At 704, the AMD 104 may determine a first physical configuration at the first time. The first physical configuration may be a physical configuration of the AMD 104 at the first time, where a physical configuration is indicative of: a first location 726(1) of the AMD 104 in a physical space 728 at the first time and a first orientation of the first portion of the AMD 104 onto which the camera is mounted at the first time. The first physical configuration may be considered first data.

At 706, the AMD 104 may determine a preferred area 722 for a user depiction 188. For example, the AMD 104 may determine first pixel coordinates associated with the first plurality of pixel data, where first area data may be indicative of the first pixel coordinates. The first area data is associated with a preferred area for subsequent user depictions in subsequent image data, such as preferred area 722. A preferred area 722 may specify an area of image data 720 where the AMD 104 attempts to locate a user depiction 188 after moving to a physical configuration based on an analysis of the image data 720.

At 708, the AMD 104 determines a first bounding box 730 of the first image data 720 associated with a user depiction 188. For example, the AMD 104 may determine that a first subset of the first plurality of pixel data represents a portion of a user, where the first subset that represents the portion of the user may be considered a user depiction 188 as described with respect to FIG. 4. The AMD 104 may also determine second pixel coordinates associated with the depiction of the user, wherein second area data may be indicative of the second pixel coordinates. In this example, the second area data may be the first bounding box 730 and may be associated with a user depiction 188 represented in the image data 720.

At 710, the AMD 104 may determine an offset 732 between the preferred area 722 and the first bounding box 730. For example, the AMD 104 may determine second data indicative of coordinate differences between the first pixel coordinates and the second pixel coordinates. The second data may be the first offset, offset 732, between the preferred area 722 and the bounding box 730. The first pixel coordinates may be pixel coordinates for a center point within the preferred area 722, and the second pixel coordinates may be pixel coordinates for a center point within the bounding box 730. Determining the offset 732 may also be done as described above with respect to FIG. 4, describing determining an offset 402 between a preferred area 182 and a bounding box 186(1).

At 712, the AMD 104 may determine, based at least on the offset 732, a second physical configuration. For example, the AMD 104 may determine, based at least on the first physical configuration and on the offset 732, a second physical configuration, where the second physical configuration is indicative of one or more of: a second physical location 726(2) of the AMD 104 in the physical space 728 or a second orientation of the first portion of the AMD 104. A user alignment module 106 may generate output used to specify the second physical configuration, as described above with respect to FIG. 4. The second physical configuration may be considered third data.

At 714, the AMD 104 may move at least a portion of the AMD 104 in accordance with the second physical configuration. For example, the AMD 104 may use the specification with the second physical configuration to: (1) move one or more actuators to drive one or more wheels in accordance with the AMD vector; (2) move, pan, or tilt the portion of the AMD 104 on which the camera is mounted in accordance with camera orientation information; or (3) move, pan, or tilt a display on the AMD 104 in accordance with the display orientation information.

In this way, the AMD 104 may acquire an image of a user, analyze the image to detect a depiction of the user, and determine a physical configuration for the AMD 104 that results in the AMD 104 acquiring subsequent image data that depicts the user being closer to, or within, a preferred area of image data.

In some examples, analyzing image data to detect a depiction of a user, and determine a physical configuration for the AMD 104 may be carried out using a more abbreviated sequence of steps, including: acquiring, using the camera mounted on the AMD 104, the first image data; determining, with respect to the first image data, a first area within the first image data that is associated with a preferred area; determining, with respect to the first image data, a second area that is associated with depiction of an object within the first image data; determining, based at least on a first offset between a first point in the first area and a second point in the second area, first data indicating a physical configuration of the AMD 104, where the physical configuration is indicative of one or more of a first physical location of the AMD 104 or an orientation of the camera; and moving the AMD 104 in accordance with the first data.

In this example, acquiring, using the camera mounted on the AMD 104, the first image data may be carried out similarly to acquiring the first image data described at 702; determining, with respect to the first image data, a first area within the first image data that is associated with a preferred area may be carried out similarly to determining a preferred area at 706; determining, with respect to the first image data, a second area that is associated with a depiction of a user within the first image data may be carried out similarly to determining a bounding box at 708; determining, based at least on a first offset between the first area and the second area, first data indicating a physical configuration of the AMD 104 may be carried out similarly to determining a second physical configuration at 712; and moving the AMD 104 in accordance with the first data may be carried out similarly to moving the AMD 104 at 714.

Figure 8:
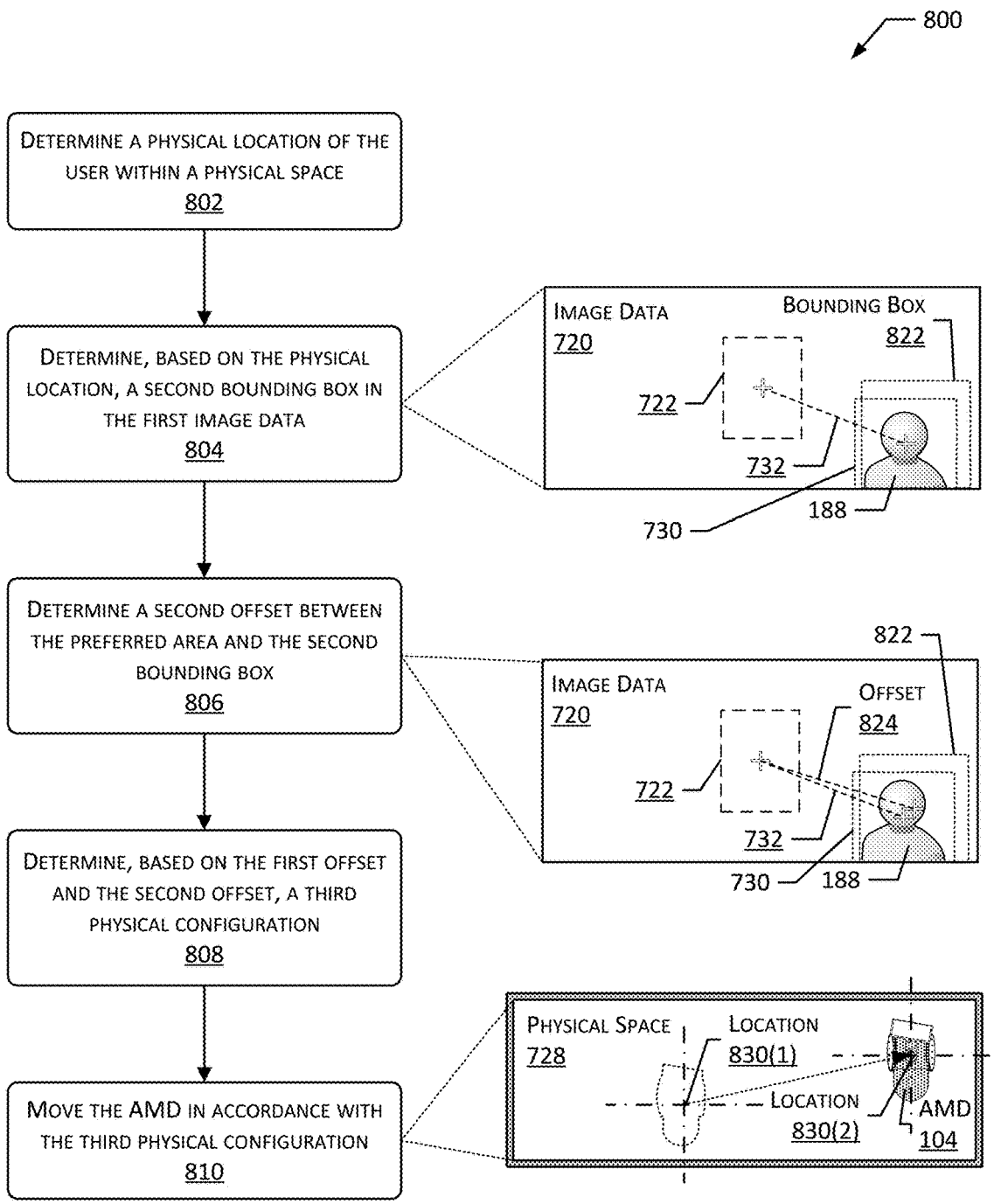
FIG. 8 is a flow diagram of a process to move the AMD to a physical configuration based on an acquired image and a location of the user in the physical space, according to some implementations.

FIG. 8 is a flow diagram 800 of a process to move the AMD 104 to a physical configuration based on an acquired image and a location of the user in the physical space, according to some implementations.

In this example, the AMD 104 combines using both (1) an image-based approach for guiding movement or physical configurations of the AMD 104, as described above with respect to FIGS. 1 and 4-7; and (2) a physical location-based approach using a determined physical location of a user within a physical space.

At 802, the AMD 104 may determine a physical location of the user within a physical space. For example, the AMD 104 may determine a first physical location of the user within the physical space 728. The AMD 104 may determine the first physical location of the user using one or more sensors 124, such as depth sensors, LIDAR, or other sensors 124, where the first physical location of the person in the physical space 728 may be determined similarly to building an occupancy map of the physical space 728.

In other examples, the AMD 104 may determine the first physical location of the user based on the first image data 720 without the use of one or more sensors used for determining the first physical location of the user in the physical space 728. For example, as described above, the AMD 104 may use a feature detection algorithm to detect a user depiction within the image data 720. The feature detection algorithm may also detect characteristics of the user, including gender and age. In this example, based at least on gender and age, the AMD 104 may reference a table that associates a first gender and a first age with first data, a second gender and a second age with second data, and so on for each gender/age combination. First data may specify, for each bounding box size and bounding box location, an associated physical location. Second data may specify, for each bounding box, size of the user depiction, an associated physical location, and so on for each gender/age combination.

At 804, the AMD 104 may determine, based on the physical location, a second bounding box in the first image data 720. For example, the AMD 104 may determine with respect to the first image data 720, third area data indicative of third pixel coordinates. The third area data comprises a second bounding box 822. The third pixel coordinates may be associated with a correspondence between the first plurality of pixel data and the first physical location of the user. The AMD 104 may determine the bounding box 822 by using the first physical location of the user and correlating the physical space 728 within the field of view of the camera used in acquiring the first image data 720. The AMD 104 may then use the correlation to predict a location of a user depiction 188 within the first image data 720. The predicted location may be a predicted representation of the user within the first image data 720, or in some cases, a predicted representation of an object. This predicted location within the first image data 720 may be used to specify the second bounding box 822, where the second bounding box 822 may be an area that includes the predicted location of the user depiction 188.

At 806, the AMD 104 may determine a second offset 824 between the preferred area 722 and the second bounding box 822. For example, the AMD 104 may determine a second value to be indicative of coordinate difference data between the first pixel coordinates and the third pixel coordinates, where the second value, or second offset, may be considered to be offset 824, and where the third area data may be the second bounding box 822. The offset 824 may be calculated as a difference between the first pixel coordinates and third pixel coordinates. The first pixel coordinates may be pixel coordinates for a center point within the preferred area 722 and third pixel coordinates may be pixel coordinates for a center point within the second bounding box 822.

In this way, two offsets 732, 824 have been determined, where offset 732 is determined using an image-based analysis of the second image data 720, and where offset 824 is determined using the first physical location of a user that is used to predict a location of a user depiction 188 within the second image data 720.

At 808, the AMD 104 may determine, based on the offset 732 and the offset 824, a third physical configuration for the AMD 104. For example, the AMD 104 may determine, based at least on the offset 732 and the offset 824, a third physical configuration, where the third physical configuration is indicative of one or more of: a third physical location of the AMD 104 in the physical space 728 or a third orientation of the first portion of the AMD 104. The third physical configuration may be considered third data.

The AMD 104 may base a determination of the third physical configuration on the offset 732 and offset 824 in different ways. For example, the AMD 104 may combine both offsets 732, 824 by averaging respective values defining both offsets 732, 824 to generate a combined offset, where the combined offset is used to determine a physical configuration similar to determining a physical configuration in FIG. 7.

As another example, one of the offsets may have a higher confidence for accuracy for determining a location of a user, and a weighted average may be used to favor the higher confidence placement technique, either the image-based analysis or the physical location-based analysis. In this way, if the offsets 732, 824 are identical, then this example responds similarly to the image-based example of FIG. 7. However, if the offsets 732, 824 are different, then the resulting physical configuration from using both an image-based analysis and a physical location-based analysis is different than if either technique were used individually.

At 810, the AMD 104 may move at least a portion of the AMD 104 in accordance with the third physical configuration. For example, the AMD 104 uses the specification with the third physical configuration to: move one or more actuators to drive one or more wheels in accordance with an AMD vector, if the AMD vector is generated; move, pan, or tilt the portion of the AMD 104 on which the camera is mounted in accordance with camera orientation information; or move, pan, or tilt a display on the AMD 104 in accordance with the display orientation information.

Figure 9:
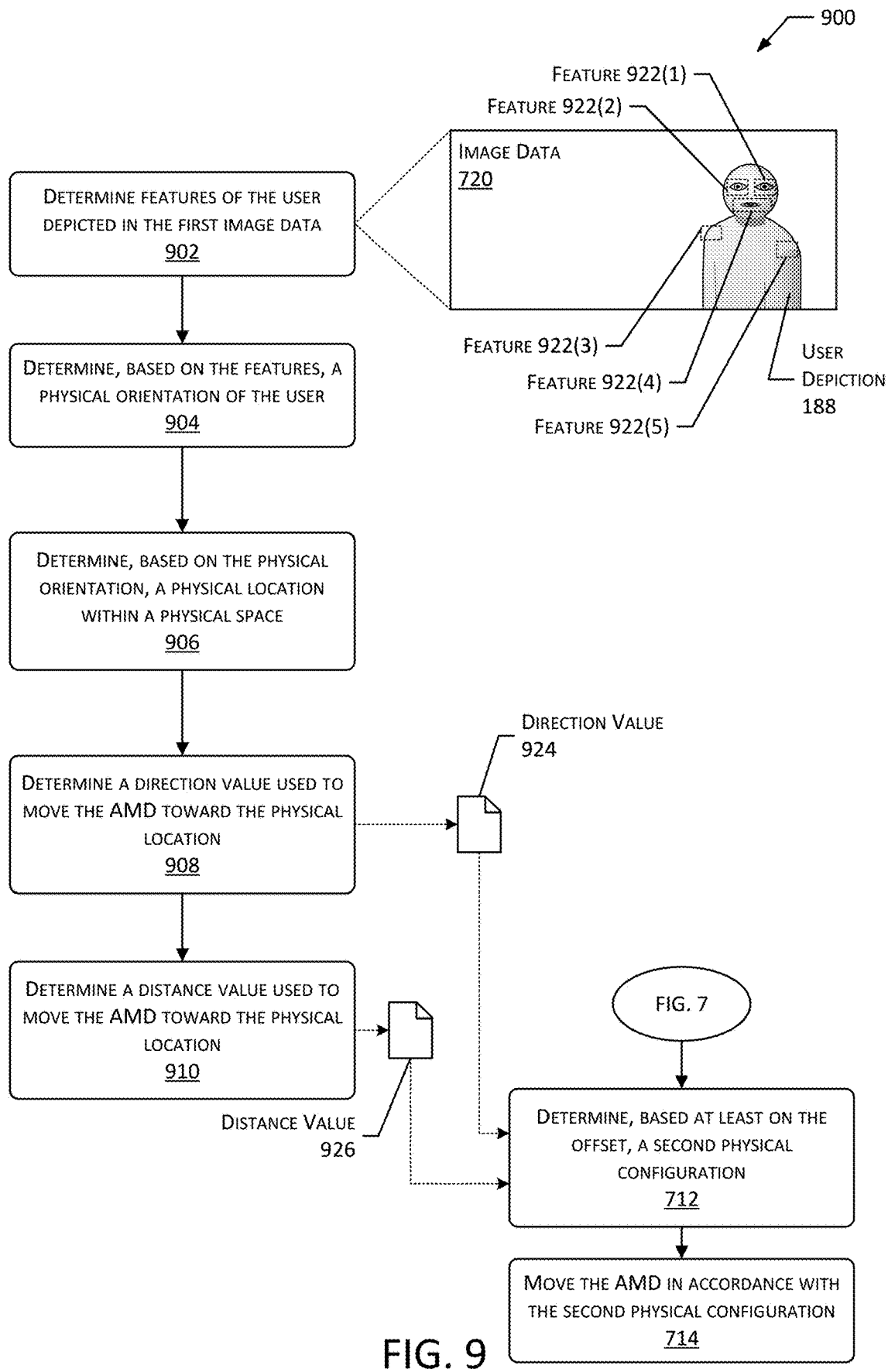
FIG. 9 is a flow diagram of a process to move the AMD to a physical configuration based on facial features in an acquired image, according to some implementations.

FIG. 9 is a flow diagram of a process to move the AMD 104 to a physical configuration based on facial features in an acquired image, according to some implementations.

At 902, the AMD 104 determines features of the user depiction 188 in the first image data 720. For example, the AMD 104 may determine a plurality of features 922(1-5) of the user depiction 188 in the first image data 720 using the feature detection module described above with respect to FIG. 4. As discussed with respect to FIG. 4, facial features may be detected, torso features may be detected, or both facial and torso features may be detected.

At 904, the AMD 104 may determine, based on the features, a physical orientation of the user. For example, the AMD 104 may determine, based at least in part on the plurality of features 922 of the face, a physical orientation of the user. The AMD 104 may determine planes and orientations of the planes using the plurality of features 922 and extruding a normal from a selected plane corresponding to, say, facial features. In this example, the physical orientation may correspond to this calculated normal.

At 906, the AMD 104 may determine, based on the physical orientation, a physical location within the physical space. For example, the AMD 104 may determine a third physical location in a direction in front of the user within the physical space 728, where the direction is based at least on the physical orientation of the user. For example, the physical orientation may have X-Y coordinates that are mapped onto the floor of the physical space, where the X-Y coordinates may correspond to points on a line along the floor. The line along the floor of the physical space may intersect with X-Y coordinates of a projection of the normal on the X-Y plane, and the intersection may be used to determine the physical location specified in the second physical configuration.

The AMD 104 may correlate the line to an occupancy map of the physical space and determine a path for the AMD 104 from a current or second physical location to a third physical location that intersects the line while maintaining the depiction of the user within the bounds of field of view of the camera. In some examples, the AMD 104 may determine a path that intersects with the line while maintaining the depiction of the user within a preferred area of image data acquired during movement of the AMD 104.

At 908, the AMD 104 may determine a direction value 924 used to move the AMD 104 toward the physical location. For example, the AMD 104 may determine a first value indicative of a direction from the AMD 104 toward the third physical location. The first value may be the direction value 924 used to move the AMD 104 toward the third physical location. As discussed above, the physical location of the line and the determined path may be used to determine a direction value 924 in which to move the AMD 104. This direction value 924 may be included in a specification of an AMD vector within a physical configuration.

At 910, the AMD 104 may determine a distance value 926 used to move the AMD 104 toward the physical location. For example, the AMD 104 may determine a second value indicative of a distance from the AMD 104 toward the third physical location. The distance value 926 may be associated with a distance between the AMD 104 and the third physical location. As discussed above, the physical location of the line and the determined path may be used to determine the distance value 926 in which to move the AMD 104. This distance value 926 may be included in a specification of the AMD vector within a physical configuration.

As depicted in FIG. 9, the direction value 924 and distance value 926 may be used as a basis in determining the second physical configuration as described with reference to 712 and 714 depicted here and in FIG. 7. For example, the AMD vector specification within the second physical configuration may include the direction value 924 and the distance value 926.

In this way, the AMD 104 may determine a physical configuration that is at least in part dependent upon the physical orientation of a user and move to be more directly within the line of sight of the user.

Figure 10:
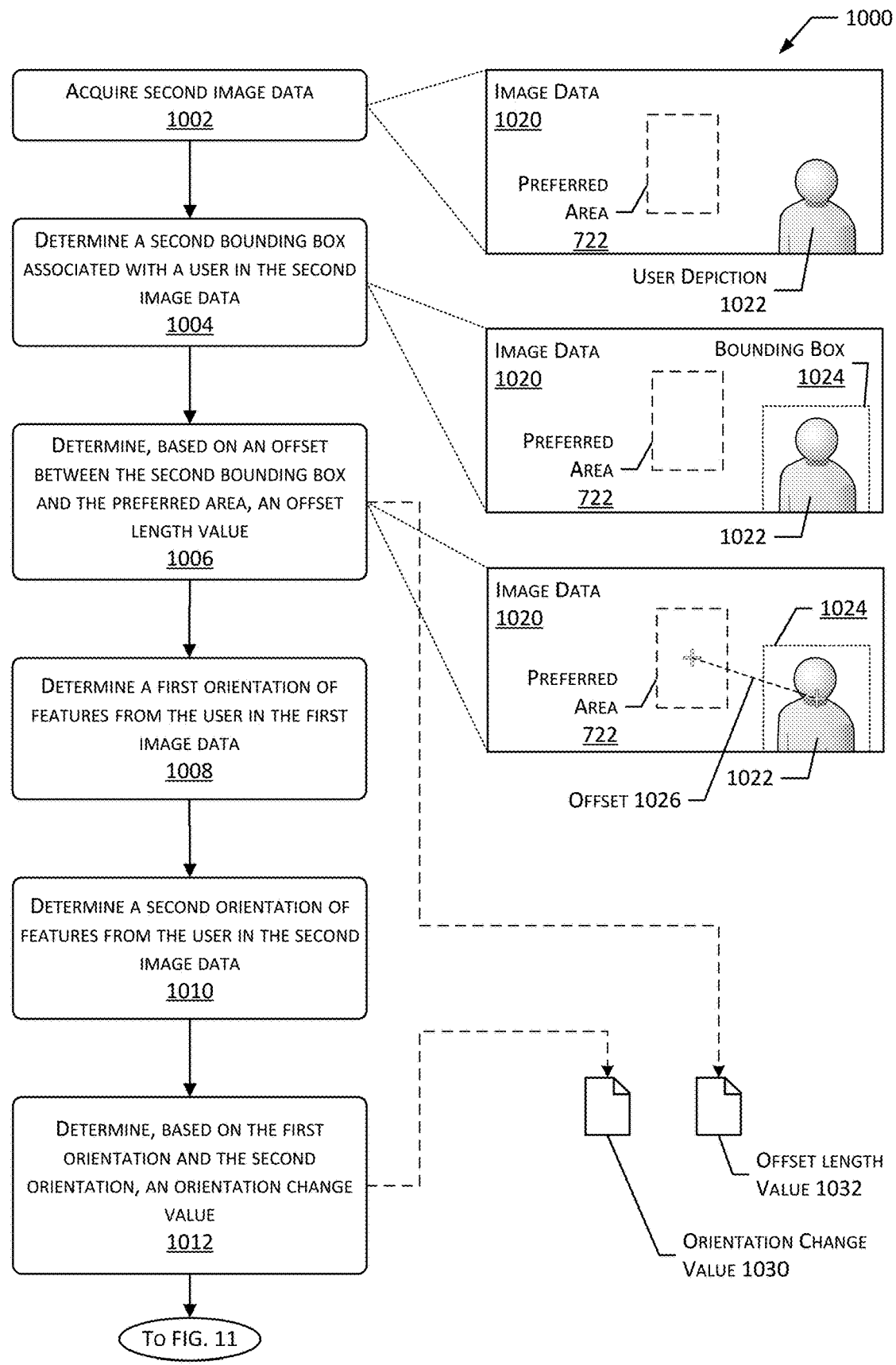
FIGS. 10 and 11 are flow diagrams of a process to move the AMD to a physical configuration based on acquired images, according to some implementations.

FIG. 10 is a flow diagram of a process to move the AMD 104 to a physical configuration based on acquired images, according to some implementations.

At 1002, the AMD 104 may acquire second image data 1020. For example, second image data 1020 may be acquired by a camera mounted on the first portion of the AMD 104. The second image data 1020 may comprise a second plurality of pixel data representative of a second image of the physical space 728.

At 1004, the AMD 104 may determine a second bounding box 1024 associated with the user depiction 1022 in the second image data 1020. For example, the AMD 104 may determine, with respect to the second image data 1020, third area data indicative of third pixel coordinates associated with the user depiction 1022, where the third area data may be the second bounding box 1024. Determining the second bounding box 1024 may be carried out similarly to determining the first bounding box 730, as described above with respect to FIG. 7.

At 1006, the AMD 104 may determine, based on an offset 1026 between the second bounding box 1024 and the preferred area 722, an offset length value 1032. For example, the AMD 104 may determine a second offset 1026 indicative of a difference between the first pixel coordinates and the third pixel coordinates. The first pixel coordinates may be pixel coordinates for a center point within the preferred area 722, and third pixel coordinates may be pixel coordinates for a center point within the bounding box 1024. The offset length value 1032 may be determined similarly to determining an offset as described with respect to FIG. 7.

At 1008, the AMD 104 may determine a first orientation of features from the user depiction 188 in the first image data 720. For example, the AMD 104 may determine, with respect to the first image data 720, a first orientation of features of the user depiction 188 in the first image data 720. The first orientation may be determined similarly to determining the feature orientation 406 described with respect to FIG. 4.

At 1010, the AMD 104 may determine a second orientation of features from the user depiction 1022 in the second image data 1020. For example, the AMD 104 may determine, with respect to the second image data 1020, a second orientation of features of the user depiction 1022 in the second image data 1020. The second orientation may be determined similarly to determining the feature orientation 406 described with respect to FIG. 4.

At 1012, the AMD 104 may determine, based on the first orientation and the second orientation, an orientation change value 1030. For example, the AMD 104 may determine, based at least in part on a difference between the first orientation and the second orientation, a first value indicative of a change in orientation of the user from the first image data 720 to the second image data 1020. The first value may be the orientation change value 1030. A difference between the first orientation and the second orientation may be determined similarly to determining the difference between the feature orientation 406 and a reference angle, as described with respect to FIG. 4.

In this example, using both the first orientation and the second orientation, the AMD 104 may determine in which direction the user is turning, and use this turning information to generate the physical configuration. In this way, the AMD 104 may move toward the user in a direction that the user is turning.

Figure 11:
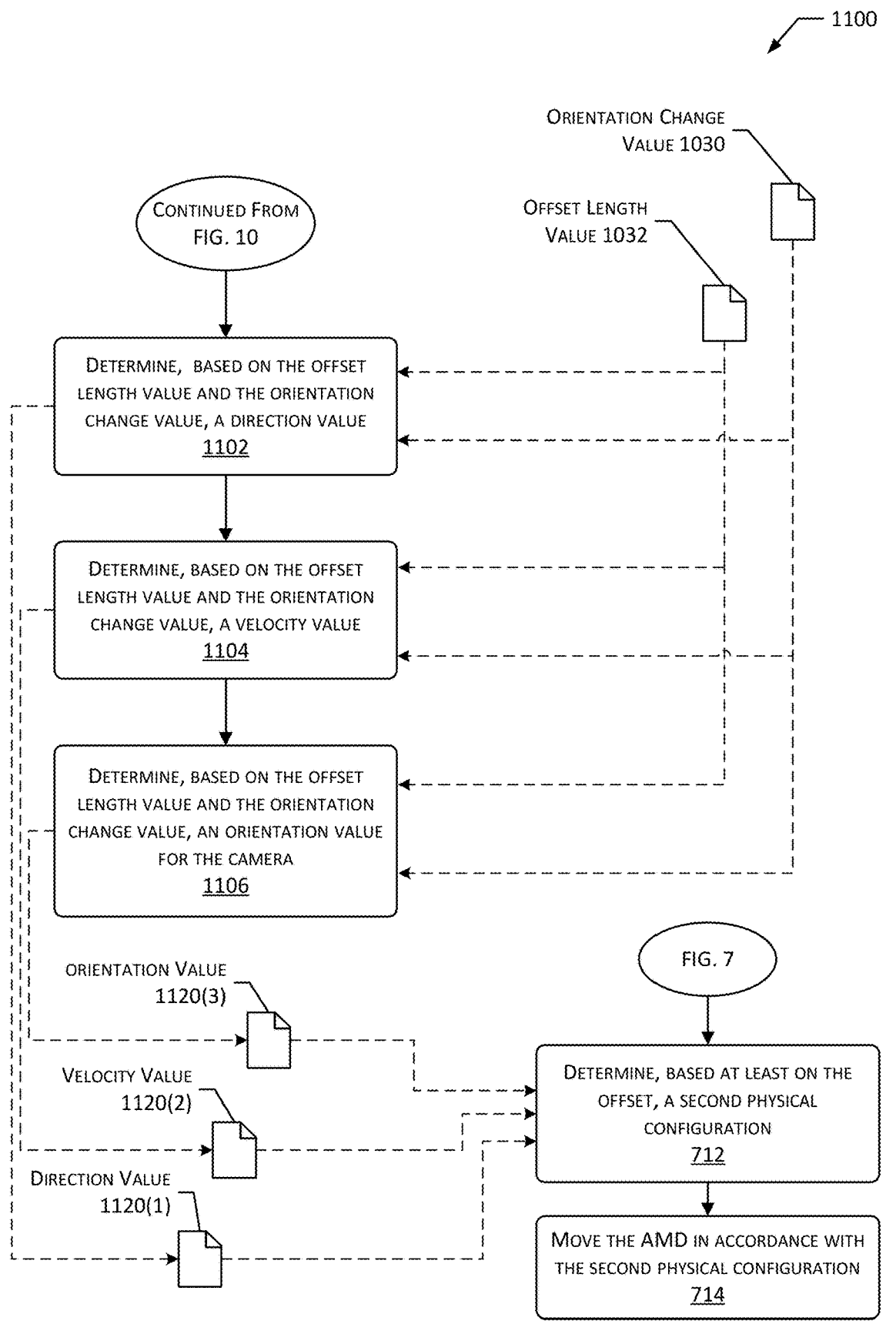

The generated orientation change value 1030 or the offset length value 1032 may be used in the flow diagram of FIG. 11, which continues from the end of the flow diagram of FIG. 10.

FIG. 11 is a continuation of the flow diagram of FIG. 10 of the process to move the AMD 104 to a physical configuration based on acquired images, according to some implementations.

At 1102, the AMD 104 may determine, based on the offset length value 1032 and the orientation change value 1030, a direction value 1120(1). For example, the AMD 104 may determine, based at least in part on the second offset and the orientation change value 1030, a second value indicative of a direction from the AMD 104 toward the second physical location, where the second value may be the direction value 1120(1). The direction value 1120(1) may be included in an AMD vector as part of a specification of a second physical configuration.

At 1104, the AMD 104 may determine, based on the offset length value 1032 and the orientation change value 1030, a velocity value 1120(2). For example, the AMD 104 may determine, based at least in part on the second offset and the orientation change value 1030, a third value indicative of a velocity of the AMD 104 in moving toward the second physical location, where the third value may be the velocity value 1120(2). The velocity value 1120(2) may be included in the AMD vector as part of a specification of a second physical configuration.

At 1106, the AMD 104 may determine, based on the offset length value 1032 and the orientation change value 1030, an orientation value 1120(3) for the camera. For example, the AMD 104 may determine, based at least in part on the second offset and the orientation change value 1030, a fourth value indicative of the orientation of the first portion of the AMD 104. The orientation value 1120(3) may specify the orientation of the first portion of the AMD 104 within the second physical configuration.

Given the orientation change value 1030 as input to the user alignment module 106, the output may be the orientation value 1120(3) specified in the second physical configuration as a pan value, a tilt value, or both pan/tilt values within either or both of the camera orientation or display orientation outputs of the user alignment module 106.

As depicted in FIG. 11, the direction value 1120(1), the velocity value 1120(2), and the orientation value 1120(3), may be used as a basis in determining the second physical configuration as depicted at 712 and 714 and as described above with reference to FIG. 7.

Figure 12:
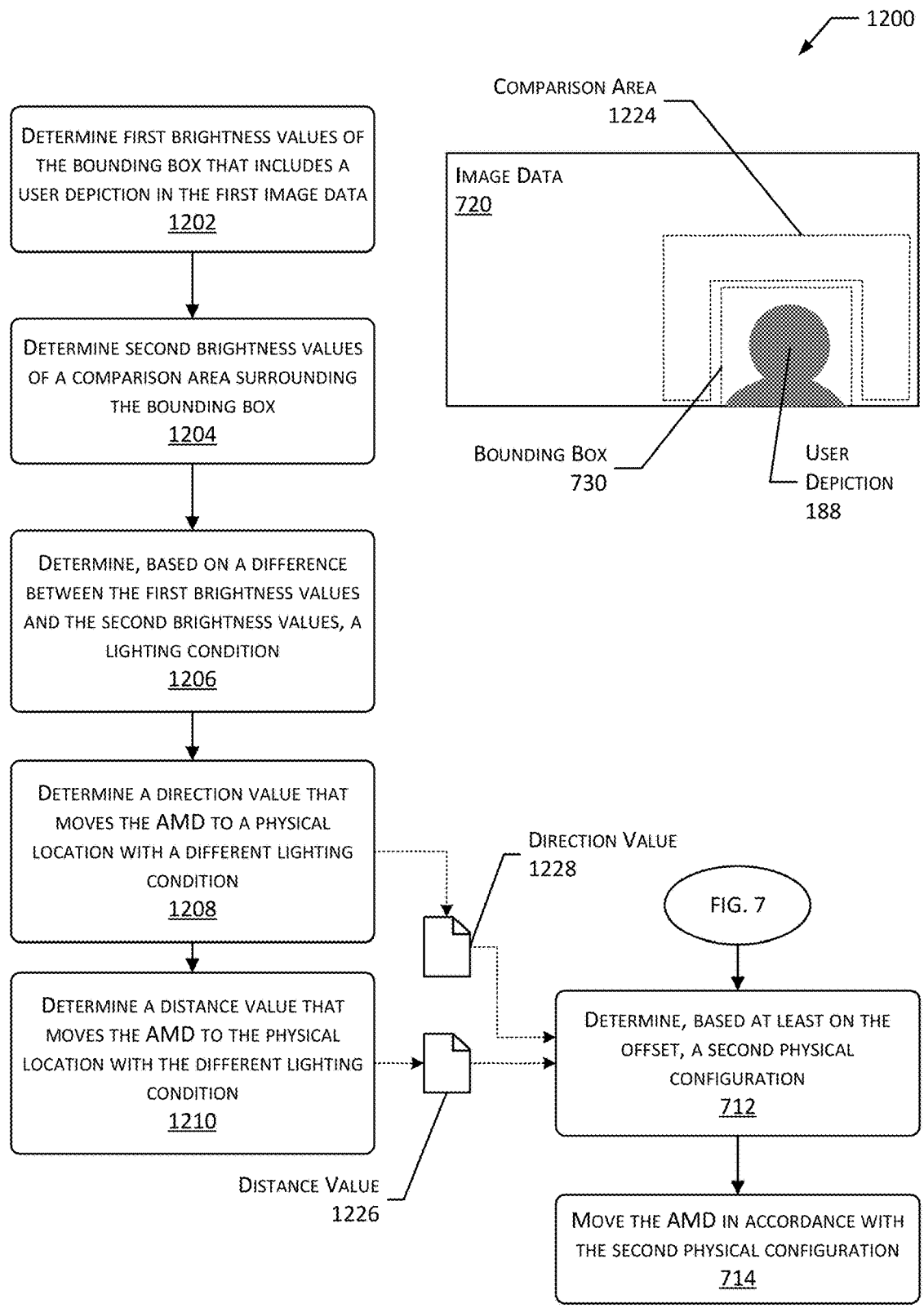
FIG. 12 is a flow diagram of an AMD detecting a lighting condition for a user, according to some implementations.

FIG. 12 is a flow diagram of an AMD 104 detecting a lighting condition for a user, according to some implementations.

In this example, the AMD 104 may detect and respond to multiple lighting conditions that prevent the AMD 104 from performing tasks or efficiently performing tasks. For example, the AMD 104 may detect that a user or object is backlit, overexposed, or oriented in a way that prevents analysis of image data.

The AMD 104 may detect a backlit lighting condition using a comparison of brightness values of pixels in a bounding box against brightness values of pixels in a comparison area surrounding the bounding box. In other examples, a backlighting condition may be detected using an edge detection algorithm or using a gradient analysis. For example, given a bounding box, the edge detection algorithm may detect an edge separating the user depiction from the physical location background. First area data may be indicative of an area of the image data that includes pixels not part of the user depiction and that are included between the edge and a first number of pixels away from the edge along the length of the edge. A second area may be an area of the image data that includes pixels that are part of the user depiction and that are included between the edge and a second number of pixels away from the edge along the length of the edge. In this example, if a difference between pixel brightness values indicated by the first area data and the second area data is greater than a first threshold, then the user depiction is determined to be backlit.

The AMD 104 may detect an overexposed lighting condition using a comparison of brightness values of pixels associated with a user depiction against a second threshold. For example, given a bounding box, the edge detection algorithm may detect an edge separating the user depiction from the physical location background. The AMD 104 may determine an average brightness of the pixels on the side of the edge that include the user depiction. In this example, if the average brightness is above a second threshold, then the user depiction is determined to be overexposed.

The AMD 104 may detect that an object is oriented in a way that prevents some analysis of image data. For example, the AMD 104 may be performing a task to find a specific object, such as a book titled "Invent & Wander". The AMD 104, using feature recognition algorithms to detect different types of objects, including books, may use image data to detect that an object is a book, but the AMD 104 may not be able to determine the title of the book based on the lighting conditions or the first orientation of the camera relative to the book. For example, the cover or spine of the book may not be within the field of view of the camera and as a result, the title is not visible for performing a character recognition analysis on the image data to determine the title. In this example, the AMD 104 may determine that a second orientation relative to the book is possible and move to a physical location from which the camera may acquire image data from the second orientation.

At 1202, the AMD 104 may determine first brightness values of a bounding box 730 that includes the user depiction 188 in the first image data 720. For example, the AMD 104 may determine a first value that is associated with the second area data, where the first value is an average brightness value associated with the first subset of the first plurality of pixel data. The first subset and the first plurality of pixel data is described above with respect to FIG. 7. For example, the second area data may be indicative of the bounding box 730. For example, the AMD 104 accesses image data 720 and determines pixel values, which include brightness values, for pixel data associated with the bounding box 730.

At 1204, the AMD 104 may determine second brightness values of a comparison area surrounding one or more areas around the bounding box 730. For example, the AMD 104 may determine third area data indicative of third pixel coordinates, where the third pixel coordinates are associated with a second subset of the first plurality of pixel data. For example, the third pixel coordinates may be associated with a depiction of a background of a user. The third pixel coordinates may be indicative of the comparison area 1224. The AMD 104 may also determine a second value associated with the third area data, where the second value is an average brightness value associated with the second subset.

For example, the AMD 104 may determine, brightness values associated with the comparison area 1224. For example, the AMD 104 may access pixel values, which include brightness values, for the comparison area 1224 of the image data 720. While depicted as a single area, in some cases, the comparison area 1224 may include one or more areas surrounding the bounding box 730, where the size of the comparison area 1224 may be specified to be similar to the bounding box 730, or some specified default size value and shape.

At 1206, the AMD 104 may determine, based on a difference between the first brightness values and the second brightness values, a lighting condition that is a first lighting condition. For example, the AMD 104 may determine, based at least on a difference between the first value and the second value exceeding a threshold, the first lighting condition, where the first lighting condition indicates the user is backlit. For example, a backlighting threshold value may be stored within alignment data 240. The backlighting threshold value may be used to compare the brightness values for pixels associated with a user depiction 188 with brightness values for pixels in the background of the user depiction 188. For example, if a difference between the average brightness value of the pixels in the bounding box 730 and the average brightness values of the pixels in the comparison area 1224 are greater than the backlighting threshold value, then the user is determined to be backlit. Similarly, based on the contrast between the first brightness values and the second brightness values not exceeding an overexposure threshold, the first lighting condition may indicate the user is overexposed.

In this example, the user depiction 188 is determined to be backlit, and the AMD 104 may determine that a light source is behind the user being depicted. Consequently, the AMD 104 may determine a third physical location in the physical space 728 to move toward that results in the light source no longer being behind the user being depicted to the extent that the backlighting condition remains. For example, the AMD 104 may select the third physical location in any direction and distance that is not recognized to include an obstacle while maintaining at least a personal space distance from the user, where the subsequent physical configuration continues to frame a user depiction 188 within a preferred area of image data 720. A personal space distance may be specified as a default value based on safety or specified by a user.

At 1208, the AMD 104 may determine a direction value 1228 used to move the AMD 104 to the third physical location with a second lighting condition that is different from the first lighting condition. For example, the AMD 104 may determine the third value indicative of the direction from the AMD 104 toward the third physical location, where the third physical location is associated with the second lighting condition. The direction may be to either side of the user but within the field of view of the camera. This direction value 1228 may be included in a specification of the AMD vector within a physical configuration.

At 1210, the AMD 104 may determine a distance value 1226 used to move the AMD 104 to the third physical location with the second lighting condition. For example, the AMD 104 may determine a fourth value indicative of a distance between the AMD 104 and the third physical location specified in a physical configuration. For example, as discussed above, the physical location may be used to determine a distance in which to move the AMD 104 and a corresponding distance value 1226. This fourth value may be the distance value 1226 and may be included in a specification of the AMD vector within a physical configuration.

As depicted in FIG. 12, the direction value 1228 and distance value 1226 may be used as a basis in determining the second physical configuration as depicted here at 712 and 714 and as described with reference to FIG. 7. For example, the AMD vector specification within the second physical configuration may include the direction value 1228 and the distance value 1226.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
acquiring, using a camera mounted on a first portion of an autonomous mobile device (AMD), first image data comprising a first plurality of pixel data representative of a first image of a physical space;
determining, using one or more processors of the AMD, first data indicative of one or more of:
a first physical location of the AMD in the physical space, or
a first orientation of the first portion of the AMD;
determining, using the one or more processors of the AMD, first pixel coordinates associated with the first plurality of pixel data;
determining, using the one or more processors of the AMD, that a first subset of the first plurality of pixel data represents a portion of a user;
determining, using the one or more processors of the AMD, second pixel coordinates associated with the first subset;
determining, using the one or more processors of the AMD, second data indicative of coordinate differences between the first pixel coordinates and the second pixel coordinates;
determining, using the one or more processors of the AMD and based on the first data and the second data, third data indicative of one or more of:
a second physical location in the physical space, or
a second orientation of the first portion of the AMD; and
moving, using one or more actuators of the AMD, one or more portions of the AMD in accordance with the third data.

2. The method of claim 1, wherein the moving the one or more portions of the AMD in accordance with the third data includes one or more of:
tilting the first portion,
panning the first portion,
raising a mast,
lowering the mast,
rotating the mast, or
driving one or more wheels of the AMD.

3. The method of claim 1, further comprising:
acquiring, using a sensor of the AMD, sensor data;
determining, using the one or more processors of the AMD and based on the sensor data, a first physical location of the user within the physical space;
determining, using the one or more processors of the AMD, third pixel coordinates that are associated with the first plurality of pixel data and the first physical location of the user;
determining, using the one or more processors of the AMD, fourth data indicative of coordinate differences between the first pixel coordinates and the third pixel coordinates; and
determining, using the one or more processors of the AMD and based at least in part on the second data and on the fourth data, fifth data indicative of one or more of:
a third physical location in the physical space, or
a third orientation of the first portion of the AMD; and
moving, using the one or more actuators of the AMD, the one or more portions of the AMD in accordance with the fifth data.

4. The method of claim 1, further comprising:
determining, using the one or more processors of the AMD and based on the first subset of the first plurality of pixel data, a plurality of features associated with the user;
determining, using the one or more processors of the AMD and based at least in part on the plurality of features, a physical orientation of the user;
determining, using the one or more processors of the AMD, a third physical location within the physical space, wherein the third physical location is in a direction in front of the user within the physical space, and wherein the direction is based on the physical orientation of the user;
determining, using the one or more processors of the AMD, a first value indicative of a direction from the AMD toward the third physical location; and
determining, using the one or more processors of the AMD, a second value indicative of a distance between the AMD and the third physical location;
wherein the determining the third data is further based on the first value and the second value.

5. The method of claim 1, further comprising:
acquiring second image data using the camera, wherein the second image data comprises a second plurality of pixel data representative of a second image of the physical space;
determining, using the one or more processors of the AMD and based on the second image data, third pixel coordinates that are associated with a second subset of the second plurality of pixel data that represents the portion of the user;
determining, using the one or more processors of the AMD, fourth data indicative of coordinate differences between the third pixel coordinates and the first pixel coordinates;
determining, using the one or more processors of the AMD and based on the first plurality of pixel data, a first orientation of features of the user;
determining, using the one or more processors of the AMD, a second orientation of the features of the user represented in the second subset;
determining, using the one or more processors of the AMD and based at least in part on a difference between the first orientation of the features of the user and the second orientation of the features of the user, a first value indicative of a change in orientation;
determining, using the one or more processors of the AMD and based at least in part on the fourth data and the first value, a second value indicative of a direction from the AMD toward the second physical location;
determining, using the one or more processors of the AMD and based at least in part on the fourth data and the first value, a third value indicative of a velocity of the AMD in moving toward the second physical location; and
determining, using the one or more processors of the AMD and based at least in part on the fourth data and the first value, a fourth value indicative of an orientation value associated with the camera;
wherein the third data is further based on at least one or more of: the second value, the third value, or the fourth value.

6. The method of claim 1, further comprising:
determining, using the one or more processors of the AMD and based at least on the first image data, a first physical location of the user in the physical space;

determining, using the one or more processors of the AMD and based on the first physical location of the user, a second subset of the first plurality of pixel data, wherein the second subset is associated with a predicted user representation within the first plurality of pixel data;

determining, using the one or more processors of the AMD, third pixel coordinates, wherein the third pixel coordinates are associated with the second subset;

determining, using the one or more processors of the AMD, fourth data indicative of coordinate differences between the third pixel coordinates and the second pixel coordinates;

determining, using the one or more processors of the AMD, that the fourth data exceeds a calibration threshold, wherein the calibration threshold is associated with a tolerance for divergence between the second data and the fourth data; and calibrating the AMD, using the one or more processors of the AMD.

7. The method of claim 1, further comprising:

determining, using the one or more processors of the AMD, a first value that represents an average brightness value associated with the first subset;

determining, using the one or more processors of the AMD, third pixel coordinates that are associated with a second subset of the first plurality of pixel data, wherein the second subset represents a background associated with the representation of the portion of the user;

determining, using the one or more processors of the AMD, a second value that represents an average brightness value associated with the second subset;

determining, using the one or more processors of the AMD and based at least on a difference between the first value and the second value exceeding a threshold, a first lighting condition;

determining, using the one or more processors of the AMD, a third value indicative of a direction from the first physical location of the AMD toward a third physical location, wherein the third physical location is associated with a second lighting condition; and determining, using the one or more processors of the AMD, a fourth value indicative of a distance between the AMD and the third physical location;

wherein the determining the third data is further based on the third value and the fourth value.

8. The method of claim 1, further comprising:

determining, using the one or more processors of the AMD and based at least on the third data, a first value indicative of a velocity of the AMD associated with moving to the second physical location;

determining, using the one or more processors of the AMD and based at least on the third data, a second value indicative of an acceleration of the AMD associated with moving to the second physical location;

determining, using the one or more processors of the AMD and based at least on the third data, a third value indicative of a distance between the AMD and the second physical location; and providing, to a controller of the AMD, the first value, the second value, and the third value.

9. An autonomous mobile device (AMD) comprising:
a camera;
one or more actuators;
one or more memories storing computer-executable instructions; and one or more processors to execute the computer-executable instructions to:

acquire, using the camera mounted on a first portion of the AMD, first image data comprising a first plurality of pixel data representative of an image of a physical space;

determine first data indicative of one or more of:
a first physical location of the AMD in the physical space, or
a first orientation of the first portion of the AMD;

determine first pixel coordinates associated with the first plurality of pixel data;

determine a first subset of the first plurality of pixel data that represents a portion of a user;

determine second pixel coordinates associated with the first subset;

determine second data indicative of coordinate differences between the first pixel coordinates and the second pixel coordinates;

determine, based on the first data and the second data, third data indicative of one or more of:
a second physical location of the AMD in the physical space, or
a second orientation of the first portion of the AMD; and move one or more portions of the AMD in accordance with the third data.

10. The AMD of claim 9, wherein the computer-executable instructions are first computer-executable instructions, and wherein the one or more memories further store second computer-executable instructions to:

acquire, using a sensor mounted on the AMD, sensor data;

determine, based on the sensor data, a first physical location of the user within the physical space;

determine third pixel coordinates that are associated with the first plurality of pixel data and the first physical location of the user;

determine fourth data indicative of coordinate differences between the first pixel coordinates and the third pixel coordinates;

determine, based at least in part on the second data and on the fourth data, fifth data indicative of one or more of:
a third physical location in the physical space, or
a third orientation of the first portion of the AMD; and move the one or more portions of the AMD in accordance with the fifth data.

11. The AMD of claim 9, wherein the first data describes the first orientation of the first portion of the AMD, wherein the first orientation is specified by a first three orthogonal axes and a first three corresponding rotations of the first three orthogonal axes, wherein the third data describes the second orientation of the first portion of the AMD, and wherein the second orientation is specified by a second three orthogonal axes and a second three corresponding rotations of the second three orthogonal axes.

12. The AMD of claim 9, wherein the computer-executable instructions are first computer-executable instructions, and wherein the one or more memories further store second computer-executable instructions to:

determine a first physical location of the user within the physical space;

determine, based on the first physical location of the user, fourth data indicative of one or more of: a third physical location of the AMD in the physical space, or a third orientation of the first portion of the AMD; and perform, based on a difference between the third data and the fourth data exceeding a calibration threshold, one or more calibrations.

13. The AMD of claim 9, wherein the computer-executable instructions are first computer-executable instructions, and wherein the one or more memories further store second computer-executable instructions to:
   determine a first physical location of the user in the physical space;
   determine a second subset of the first plurality of pixel data, wherein the second subset is associated with a predicted user representation within the first plurality of pixel data based on the first physical location of the user;
   determine that third pixel coordinates are associated with the second subset;
   determine fourth data indicative of coordinate differences between the third pixel coordinates and the second pixel coordinates;
   determine the fourth data exceeds a calibration threshold, wherein the calibration threshold is associated with a tolerance for divergence between the second data and the fourth data; and
   calibrate the AMD.

14. The AMD of claim 9, wherein the computer-executable instructions are first computer-executable instructions, and wherein the one or more memories further store second computer-executable instructions to:
   acquire second image data using the camera, wherein the second image data comprises a second plurality of pixel data representative of a second image of the physical space;
   determine, based on the second image data, third pixel coordinates that are associated with a second subset of the second plurality of pixel data that represents the portion of the user;
   determine fourth data indicative of coordinate differences between the third pixel coordinates and the first pixel coordinates;
   determine, based on the first plurality of pixel data, a first orientation of features of the user;
   determine a second orientation of the features of the user represented in the second subset;
   determine, based at least in part on a difference between the first orientation of the features of the user and the second orientation of the features of the user, a first value indicative of a change in orientation;
   determine, based at least in part on the fourth data and the first value, a second value indicative of a direction from the AMD toward the second physical location;
   determine, based at least in part on the fourth data and the first value, a third value indicative of a velocity of the AMD in moving toward the second physical location; and
   determine, based at least in part on the fourth data and the first value, a fourth value indicative of an orientation value associated with the camera;
   wherein the third data is further based on at least one or more of: the second value, the third value, or the fourth value.

15. The AMD of claim 9, wherein the computer-executable instructions are first computer-executable instructions, and wherein the one or more memories further store second computer-executable instructions to:
   determine a first value that represents an average brightness value associated with the first subset;
   determine third pixel coordinates that are associated with a second subset of the first plurality of pixel data, wherein the second subset represents a background associated with a representation of the user;
   determine a second value that represents an average brightness value associated with the second subset;
   determine, based at least on a difference between the first value and the second value exceeding a threshold, a first lighting condition;
   determine a third value indicative of a direction from the AMD toward a third physical location, wherein the third physical location is associated with a second lighting condition; and
   determine a fourth value indicative of a distance between the AMD and the third physical location;
   wherein the determining the third data is further based on the third value and the fourth value.

16. A method comprising:
   acquiring, using a camera mounted on an autonomous mobile device (AMD), first image data comprising a first plurality of pixel data representative of an image of a physical space;
   determining, using one or more processors of the AMD, first pixel coordinates associated with the first plurality of pixel data;
   determining, using the one or more processors of the AMD and with respect to the first image data, second pixel coordinates associated with a representation of an object in the first plurality of pixel data;
   determining, using the one or more processors of the AMD and based at least on coordinate differences between the first pixel coordinates and the second pixel coordinates, first data indicative of one or more of: a first physical location of the AMD or an orientation of the camera; and
   moving, using one or more actuators of the AMD, one or more portions of the AMD in accordance with the first data.

17. The method of claim 16, further comprising:
   determining, using the one or more processors of the AMD and based at least on the first image data, a first physical location of the object in the physical space;
   determining, using the one or more processors of the AMD, a first subset of the first plurality of pixel data, wherein the first subset is associated with a predicted representation of the object within the first plurality of pixel data based on the first physical location of the object;
   determining, using the one or more processors of the AMD, third pixel coordinates that are associated with the first subset;
   determining, using the one or more processors of the AMD, second data indicative of coordinate differences between the third pixel coordinates and the second pixel coordinates;
   determining, using the one or more processors of the AMD, that the second data exceeds a calibration threshold, wherein the calibration threshold is associated with a tolerance for divergence between the second data and third data, wherein the third data is indicative of coordinate differences between the first pixel coordinates and the second pixel coordinates; and
   calibrating the AMD, using the one or more processors of the AMD.

18. The method of claim 16, the method further comprising:
- acquiring second image data using the camera, wherein the second image data comprises a second plurality of pixel data representative of a second image of the physical space;
- determining, using the one or more processors of the AMD and with respect to the second image data, third pixel coordinates that are associated with a first subset of the second plurality of pixel data that represents the object;
- determining, using the one or more processors of the AMD, second data indicative of coordinate differences between the third pixel coordinates and the first pixel coordinates;
- determining, using the one or more processors of the AMD and based on the first plurality of pixel data, a first orientation based on features of the object;
- determining, using the one or more processors of the AMD, a second orientation based on the features of the object represented in the first subset;
- determining, using the one or more processors of the AMD and based at least in part on differences between the first orientation based on the features of the object and the second orientation based on the features of the object, a first value indicative of a change in orientation;
- determining, using the one or more processors of the AMD and based at least in part on the second data and the first value, a second value indicative of a direction from the AMD toward the first physical location of the AMD;
- determining, using the one or more processors of the AMD and based at least in part on the second data and the first value, a third value indicative of a velocity of the AMD in moving toward the first physical location of the AMD; and
- determining, using the one or more processors of the AMD and based at least in part on the second data and the first value, a fourth value indicative of the orientation of the camera;
- wherein the first data is further based on at least one or more of: the second value, the third value, or the fourth value.

19. The method of claim 16, further comprising:
- acquiring, using a sensor mounted on the AMD, sensor data;
- determining, using the one or more processors of the AMD and based at least on the sensor data, a first physical location of the object in the physical space;
- determining, using the one or more processors of the AMD, a first subset of the first plurality of pixel data, wherein the first subset is associated with a predicted representation of the object within the first plurality of pixel data based on the first physical location of the object;
- determining, using the one or more processors of the AMD, third pixel coordinates that are associated the first subset;
- determining, using the one or more processors of the AMD, second data indicative of coordinate differences between the third pixel coordinates and the second pixel coordinates;
- determining, using the one or more processors of the AMD, that the second data exceeds a calibration threshold, wherein the calibration threshold is associated with a tolerance for divergence between the second data and third data, wherein the third data is indicative of coordinate differences between the first pixel coordinates and the second pixel coordinates; and
- calibrating the AMD, using the one or more processors of the AMD.

20. The method of claim 16, further comprising:
- determining, using the one or more processors of the AMD, a first value that represents an average brightness value associated with a first subset of the first plurality of pixel data associated with the representation of the object;
- determining, using the one or more processors of the AMD, third pixel coordinates that are associated with a second subset of the first plurality of pixel data associated with a representation of a background of the object;
- determining, using the one or more processors of the AMD, a second value that represents an average brightness value associated with the second subset;
- determining, using the one or more processors of the AMD and based at least on differences between the first value and the second value exceeding a threshold, a first lighting condition;
- determining, using the one or more processors of the AMD, a third value indicative of a direction from the AMD toward a second physical location, wherein the second physical location is associated with a second lighting condition; and
- determining, using the one or more processors of the AMD, a fourth value indicative of a distance between the AMD and the second physical location;
- wherein determining the first data is further based on the third value and the fourth value.

* * * * *